United States Patent [19]

Vijaykumar

[11] Patent Number: 5,745,896
[45] Date of Patent: *Apr. 28, 1998

[54] REFERENTIAL INTEGRITY IN A RELATIONAL DATABASE MANAGEMENT SYSTEM

[76] Inventor: Narayanan Vijaykumar, 109 Felix St. #5, Santa Cruz, Calif. 95060

[ * ] Notice: The term of this patent shall not extend beyond the expiration date of Pat. No. 5,499,359.

[21] Appl. No.: 612,638

[22] Filed: Mar. 8, 1996

Related U.S. Application Data

[63] Continuation of Ser. No. 183,619, Jan. 18, 1994, Pat. No. 5,499,359.
[51] Int. Cl.$^6$ .................................................. G06F 17/30
[52] U.S. Cl. .................................. 707/100; 707/1; 707/4
[58] Field of Search ................................. 395/604, 611, 395/601

[56] References Cited

U.S. PATENT DOCUMENTS

| | | | |
|---|---|---|---|
| 4,933,848 | 6/1990 | Haderle et al. | 395/600 |
| 4,947,320 | 8/1990 | Crus et al. | 395/600 |
| 5,072,378 | 12/1991 | Manka | 395/575 |
| 5,133,068 | 7/1992 | Crus et al. | 395/600 |
| 5,193,183 | 3/1993 | Bachman | 395/601 |
| 5,226,158 | 7/1993 | Horn et al. | 395/600 |
| 5,237,556 | 8/1993 | Mohan et al. | 395/600 |
| 5,263,165 | 11/1993 | Janis | 395/725 |
| 5,285,528 | 2/1994 | Hart | 395/725 |
| 5,287,521 | 2/1994 | Nitta et al. | 395/725 |
| 5,319,780 | 6/1994 | Catino et al. | 395/600 |
| 5,481,700 | 1/1996 | Thuraisingham | 395/609 |

OTHER PUBLICATIONS

Date, C., *An Introduction to Database Systems*, vol. I, 5th Ed., Addison–Wesley Publishing Co., 1990, pp. 275–288.
Pascal, F., *SQL and Relational Basics, Chapter 4: Integrity Features*, M&T Books, 1990, pp. 71–81.
Bill Lawrence, *Paradox for Windows*, Lotus, V8, No. 9, Sep., 1992, pp. 58–59.
*Paradox Version 4.0 User's Guide*, Borland International (Scotts Valley, CA, 1992), pp. 271–272, 569–582.
Venditto, et al., 9 Multiuser Databases: Robust and Ready to Share, PC Magazine, V11, No. 6, Mar. 31, 1992, pp. 289–317.
Anonymous, *Multi–User Databases*, Computing Canada, V18, No. 11, May 25, 1992, pp. 18–19.
Catchings, et al., Paradox for Windows: More than a Face–Lift, PC Week, V9, No. 19, May 11, 1992.
Brian J. Smith, *Paradox 4.0: The Excellent Gets Better*, Data–Based Advisor, V10, No. 6, Jun., 1992, pp. 108–114.
Rick Scott, Paradox for Windows Builds Powerful Apps., PC–Computing, V5, No. 7, Jul., 1992, pp. 40–44.

*Primary Examiner*—Paul R. Lintz

[57] ABSTRACT

A system of the present invention includes a PC-based relational database management system (PC RDBMS) with data integrity facilities. Methods are described for maintaining referential integrity between data tables which may be freely moved to various remote workstations—ones which do not have ready access to a centrally-maintained data dictionary. The system provides each table with descriptors for tracking referential integrity links or relationships among various tables, regardless of a particular situs where a table resides. A preferred interface is also described for permitting end-users to easily define referential integrity links between data tables.

31 Claims, 23 Drawing Sheets

INFORMATION TABLES 375

CUSTOMER.DB
| CUSTOMER NO | NAME | STREET | CITY | STATE/PROV | ZIP/POSTAL CODE | COUNTRY | PHONE | FIRST CONTACT |

ORDERS.DB
| ORDER NO | CUSTOMER NO | SALE DATE | SHIP DATE | SHIP VIA | TOTAL INVOICE | AMOUNT PAID | BALANCE DUE | TERMS | PAYMENT METHOD | MONTH |

LINEITEM.DB
| ORDER NO | STOCK NO | SELLING PRICE | QTY | TOTAL |

STOCK.DB
| STOCK NO | VENDOR NO | EQUIPMENT CLASS | MODEL | PART NO | DESCRIPTION | CATALOG DESCRIPTION | QTY | LIST PRICE |

VENDORS.DB
| VENDOR NO | VENDOR NAME | STREET | CITY | STATE/PROV | COUNTRY | ZIP/POSTAL RT | PHONE | FAX | PREFERRED |

POSSIBLE LINKS ------

*FIG. 3F*

REFERENTIAL INTEGRITY IN A RELATIONAL DATABASE MANAGEMENT SYSTEM

The present application is a continuation application of application Ser. No. 08/183,619, filed Jan. 18, 1994, now U.S. Pat. No. 5,499,359.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to maintaining data integrity among data tables stored in a non-centralized data processing system, such as a Personal Computer Database Management System (PC DBMS).

Computers are a powerful tool for the acquisition and processing of information. Computerized databases can be regarded as a kind of electronic filing cabinet or repository for collecting computerized data files; they are particularly adept at processing vast amounts of information quickly. As such, these systems serve to maintain information in database files or tables and make that information available on demand. Of these systems, ones which are of particular interest to the present invention are Relational Database Management Systems (RDBMSs).

The concept of relational databases is perhaps best introduced by reviewing the problems surrounding traditional or non-relational systems. In a traditional database system, the task of retrieving information of interest (i.e., answering a "database query") is left to the user; that is, the user must give detailed instructions to the system on exactly how the desired result is to be obtained.

Consider the example of a simple query: "Who are the teachers of student John Smith?" In a traditional system, several explicit instructions are required before the query can be answered. One instruction, for instance, is typically to instruct the system to allocate sections in memory for data to be read from a storage disk. Another command may tell the system which disk files to open and read into the allocated memory for processing. Still other commands may specify particular search strategies, such as use of specific indexes, for speeding up the result of the query. And still even further commands may be needed for specifying explicit links between two or more files so that their data may be combined. Thus, instead of just telling the system "what" is desired (i.e., the desired data result as expressed in a query expression), one must specify internal procedures (i.e., the "how") for obtaining the data. Even for a simple query, such as that above, the task is complex, tedious, and error-prone.

From the user's perspective, such details—ones directed to the physical implementation—are completely irrelevant; the user is interested only in the result. Thus, the lack of separation of logical operations from the physical representation of the data (i.e., how it is internally stored and accessed by the system) in traditional systems burdens users with unnecessary complexity. Moreover, as traditional database products employ proprietary data access procedures, knowledge of one product is not necessarily helpful in use of another. And where database systems differ, their practitioners cannot effectively communicate with one another.

In 1970, Dr. E. F. Codd invented the "relational model", a prescription for how a DBMS should operate. The relational model provides a foundation for representing and manipulating data, that is, a way of looking at data. The model includes three basic components: structure, integrity, and manipulation. Each will be described in turn.

The first of these, structure, is how data should be presented to users. A database management system is defined as "relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes).

Ideally, data in a relational system is perceived by users as tables and nothing but tables. This precludes the user from seeing explicit connections or links between tables, or having to traverse between tables on the basis of such links. It also precludes user-visible indexes on fields and, in fact, precludes users from seeing anything that smacks of the physical storage implementation. Thus, tables are a logical abstraction of what is physically stored.

The integrity aspect, on the other hand, dictates that every relation (i.e., table) should have a unique, primary key to identify table entries or rows. The integrity of the data for the user is of course crucial. If accuracy and consistency of the data cannot be achieved, then the data may not be relied upon for decision-making purposes.

Data manipulation, the last component, may be thought of as cut-and-paste operators for tables. Data manipulation is of course the purpose for which databases exist in the first place. The superiority of manipulating tables relationally (i.e., as a whole, or sets of rows) is substantial. Users can combine data in various tables logically by matching values in common columns, without having to specify any internal details or the order in which tables are accessed; this provides users with a conceptual view of the database that is removed from the hardware level. Non-relational DBMSs, in contrast, require complex programming skills that form an inherently unreliable means to interact with databases.

The general construction and operation of a database management system is known in the art. See e.g., Date, C., *An Introduction to Database Systems*, Volumes I and II, Addison Wesley, 1990; the disclosures of which are hereby incorporated by reference.

Often it is desirable to specify referential integrity relationships or "links" between various data tables. For instance, it may be desirable to allow only records having a valid customer number to be posted to an Order table. This may be achieved by requiring the customer number of each order to be posted to match an existing customer number stored, for instance, in a Customer table. In this manner, records with incorrect customer numbers cannot be posted, thereby preventing corruption of the Order table.

With the movement of data processing chores from mainframe computers to desktop computers, however, a particular problem has arisen with implementing data integrity in PC RDBMS systems. Prior art systems, such as SQL-based systems, commonly employ a database data dictionary or catalog—a centrally-maintained catalog storing information specifying integrity relationship between various data tables. In a PC DBMS environment, however, data tables may be maintained on any one of a number of remote workstations—computers which do not have ready access a centrally-maintained data dictionary. And end-users of such PC systems demand the flexibility to freely move data tables among various PCs. Accordingly, the prior art approach to enforcing data integrity is not well suited for data tables on PC systems.

What is needed are system and methods which allow users of PC DBMS system to define referential integrity links between data tables and have the system maintain data integrity without requiring access to a centrally-maintained data dictionary. In particular, such a system would allow end users to transfer families of such data tables to remote workstations, while maintaining referential integrity relationship within a particular family of data tables.

SUMMARY OF THE INVENTION

A system of the present invention includes a relational database management system (RDBMS), where information is maintained in one or more database tables for easy, efficient storage and retrieval. In addition to database tables, the system provides "design documents" which allow a user to customize how his or her data are presented, including formats which are not tabular. Design documents can also link together different tables, so that information stored in separate tables appears to the user to come from one place.

System and methods are described for maintaining integrity between data tables. The system includes a preferred interface for defining referential integrity links between data tables. In particular, during the process of creating or restructuring a table, the system provides a Referential Integrity dialog box which allows the user to define a referential relationship between two tables. In operation, the user selects a field from the child table (i.e., the one he or she is creating or restructuring), and then selects a table containing all valid values for the selected field (i.e., the table to serve as the parent or reference table). In this manner, users may quickly specify a referential integrity link between data tables. Defining a referential integrity rule assures that all related records are handled by the system in a consistent manner during data entry (or modification).

Internally, the system employs a "value check" for maintaining referential integrity information, thus allowing referential integrity for a table to be maintained with the table regardless of where the table is located (e.g., moved to a remote workstation). The "value check" may be stored as part of the table (e.g., in a header, or as a special record) or, in a preferred embodiment, stored as part of a "value check" (.VAL) file for a particular family of database objects. (Family members include a database table and its related objects, such as forms, data validation, reports, indexes, and the like. The base name of the database table identifies all related members of a given family.) The system maintains integrity information in two subsections: Foreign Key Descriptors and Embedded Key Descriptors. The system tracks for each table all the master tables to which it points and all the detail tables from which it depends. The Foreign Key Descriptors are self-contained modules which completely characterize each foreign key which the table supports. In a corresponding manner, the Embedded Key Descriptors are self-contained modules which completely describe the responsibility of the table as a master to one or more dependent tables.

A method is also described whereby the integrity information is processed at runtime, preferably during a data record operation (e.g., insert, delete, or modify). The method includes steps for verifying that the integrity constraints are satisfied before the specified record operation is permitted.

BRIEF DESCRIPTION OF THE DRAWINGS

FIGS. 3C-E are bitmap screenshots illustrating use of the Desktop's client area for displaying and manipulating major objects of the system, including table objects, form objects, report objects, and the like.

FIG. 3F is a block diagram of a sample database system for tracking sales orders.

FIGS. 3G-K are bitmap screenshots illustrating the structuring of information tables for the system of FIG. 3F.

Figure 1A:
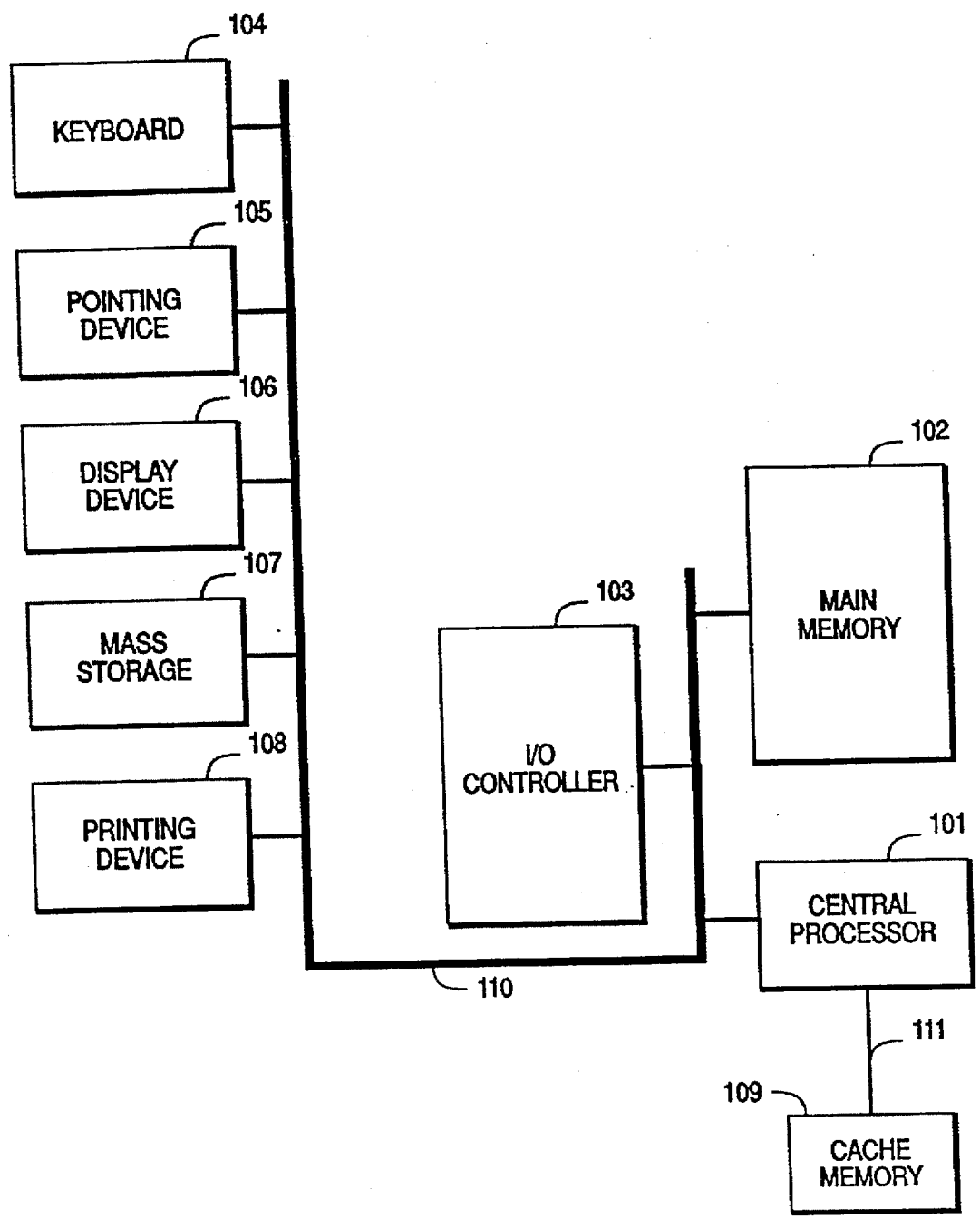
FIG. 1A is a block diagram of a computer system in which the present invention may be embodied.

GLOSSARY access (disk access): To obtain entry to, or to locate, read into memory, and make ready for some operation. Access is used with regard to disks, files, records, and network entry procedures.

allocate: To reserve memory for use by a program. Programs often need certain system resources such as memory or disk space, which are requested as needed from the operating system.

append: To attach to the end of; this is most often used in reference to writing to a file (adding data to the end of the file).

block (storage block): A group of similar things—usually bytes of storage or data. In disk storage, a block is a collection of consecutive bytes of data that are read from or written to the disk as a group.

database: An organized collection of information.

Database Management System (DBMS): System that controls the organization, storage, and retrieval of information in a database.

directory (and subdirectory): A way of organizing and grouping the files on a disk; typically, presented to the user as a catalog for file names and other directories stored on a disk. What the user views as a directory is supported in the operating system by tables of data, stored on the disk, that contain characteristics associated with each file, as well as the location of the file on the disk.

field: A member of a row that holds a data value associated with an attribute.

file: A conglomeration of instructions, numbers, words, or images stored as a coherent unit which may be operated upon as a unit (e.g., for retrieving, changing, deleting, saving and the like). A disk file is a basic unit of storage that enables a computer to distinguish one set of information from another; it typically includes at least one complete collection of information, such as a program, a set of data used by a program, or the like.

file handle: A "token" (number) that the system uses in referring to an open file. A file handle, like a "CB handle," is a unique identifier.

file name: A file name is a name assigned for identifying a file.

header: Typically the first data in a file, a header stores identity, status, and other data of a file.

index: A stored collection of keys (see below) which facilitate record operations, including searching, inserting, and deleting. Such data structures can include hash tables, binary trees, and B-trees.

input/output: Often abbreviated I/O, input/output refers to the complementary tasks of gathering data for the microprocessor to work with and making the results available to the user through a device such as the display, disk drive, or printer.

location (storage location): The position at which a particular item can be found. A storage location can be an addressed (uniquely numbered) location in memory or it can be a uniquely identified location (sector) on disk.

read (disk read): Read is the operation of receiving input into the computer from a peripheral device, such as a disk. A read is an I/O operation: data is being output from the peripheral device and input into the computer.

referencing: Addressing or otherwise targeting a desired object (e.g., file) at a particular (addressable) location.

resource: Any part of a computer system or network, such as a disk drive, printer, or memory, that can be allotted to a program or a process while it is running.

row: Physically, a row is usually a record in a data file. Logically, a row is one horizontal member of a table: a collection of fields.

storage device: Any apparatus for recording information in permanent or semipermanent form. Most commonly refers to a disk drive.

table: A structure that contains information. Usually, a collection of rows all stored in one logical file.

write (disk write): To transfer information either to a storage device, such as a disk, or other output device. A disk write transfers information from memory to storage on disk.

DETAILED DESCRIPTION OF A PREFERRED EMBODIMENT

The following description will focus on the presently preferred embodiment of the present invention, which is operative in the Microsoft® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NeXTSTEP, and the like. Therefore, the description of the exemplary embodiments which follows is for purposes of illustration and not limitation.

System Hardware

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an onchip cache or external cache (as shown). Additional input/output devices, such as a printing device 108, may be included in the system 100 as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.).

System Software

A. Overview

Figure 1B:
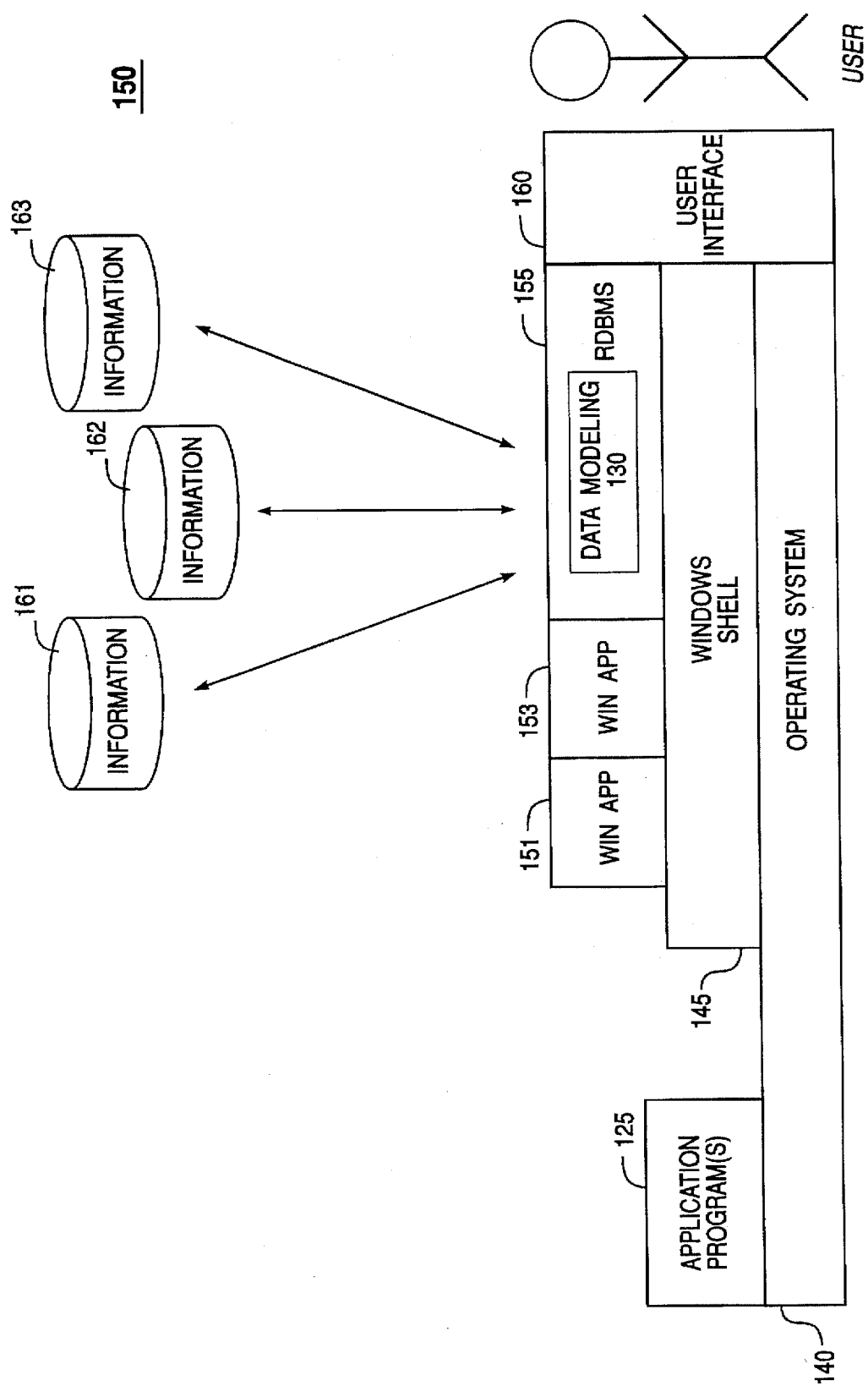
FIG. 1B is a block diagram of a software system of the present invention, which includes operating system, application software, relational database management system, and user interface components.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 125 or one or more windows application software 151, 153, 155, may be "loaded" (i.e., transferred from storage 107 into memory 102) for execution by the system 100. As shown, windows application software includes a Relational Database Management System (RDBMS) 155 of the present invention.

System 150 includes a user interface (UI) 160, preferably a Graphical User Interface (GUI), for receiving user commands and data. These inputs, in turn, may be acted upon by the system 100 in accordance with instructions from operating module 140, windows 145, and/or application modules 125, 151, 153, 155. The UI 160 also serves to display the results of operation from the OS 140, windows 145, and applications 125, 151, 153, 155, whereupon the user may supply additional inputs or terminate the session. Although shown conceptually as a separate module, the UI is typically provided by interaction of the application modules with the windows shell, both operating under OS 140. In a preferred embodiment, OS 140 is MS-DOS and windows 145 is Microsoft® Windows; both are available from Microsoft Corporation of Redmond, Wash. RDBMS 155 includes Paradox® for Windows Database Management System, available from Borland International of Scotts Valley, Calif.

B. Relational Database Management System

RDBMS 155 is a system that controls the organization, storage, and retrieval of information from a database. A database is an organized collection of related information or data stored for easy, efficient use. An address book is a database, as is the card catalog in a library, a company's general ledger, and a completed tax form. Thus, a database is a collection of one or more tables used to keep track of information, such as the information 161, 162, 163 of system 150.

1. Tables

In a relational database management system, information is represented in tables. As conceptually shown in FIG. 1C, a table 170 is organized (logically) into horizontal rows (tuples) 173 and vertical columns 175, thus making it easy for a user to examine or change data. Each row or "record" contains all available information about a particular item, such as storing information about an individual person, place, or thing (depending on what the table tracks). A record for an employee, for instance, may include information about the employee's ID Number, Last Name and First Initial, Position, Date Hired, Social Security Number, and Salary. Thus, a typical record includes several categories of information, that is, each record in the table is made up of several categories of information about one specific thing.

Although a database record includes information which is most conveniently represented as a single unit, the record itself includes one or more columns or categories of information. A vertical column contains one category of the data or "field" that makes up a record. Each field contains one category of information about the person, place, or thing described in the record. In the employee table, categories include ID Number, Last Name and First Initial, Position, Date Hired, Social Security Number, Salary, and so on.

Each field has a field type specifying what sort of information the field can hold and what actions can be performed with that field's data. The system categorizes fields into several types. Each field's type determines the kind of data it contains. Some common field types include alphanumeric (or character), number, date, currency, and memo. System tables also support binary large objects fields, which hold specialized information, such as formatted memos, graphic images, and OLE links.

Internally, tables may be stored by the system as a sequence of fixed-length or variable-length binary records in a single disk file. The system uses a record number as an internal counter to keep track of each record. Between the actual physical database itself (i.e., the data actually stored on a storage device) and the users of the system, therefore, a database management system or DBMS provides a software cushion or layer. Because the DBMS shields the database user from knowing or even caring about underlying hardware-level details, the system manages record numbers automatically, with precautions taken so a user cannot change them directly. Thus, all requests from users for access to the data, including requests to retrieve, add, or remove information from files, are processed by the RDBMS without the user's knowledge of underlying system implementation.

2. Keys

As previously described, every relation (i.e., table) requires a unique, primary key to identify table entries or rows. Thus, a primary key (or just "key") is one or more fields containing data that uniquely identifies each record of a table. In addition to creating a key on just a single field (e.g., key on Last Name), a user may create a "composite key" for a group of fields (e.g., key on Last Name+First Name). Whether a simple or composite key is employed, a key requires a unique value for each record (row) of a table to ensure that a table does not have duplicate records.

Often for a given table, it is possible another set of fields in a table could have been employed as the primary key. All column combinations with unique values form a pool of "candidate keys," from which one is selected as the primary key. The rest remain alternate keys. In SQL and some other databases, candidate keys are generally recognizable because a "unique" index is likely to have been declared upon them. They can (at least in theory) be declared without necessarily having an index. Also, a unique index does not necessarily imply a candidate key; the fields could be only occasionally used and, hence, not valuable as identifiers for the entire table.

A table that has a key defined is said to be a "keyed" table. A table's key establishes the default sort order for the table. The system sorts the table's records based on the values in the field(s) the user defines as the table's key. This makes it easy for the system to find and process records quickly and to preserve the discipline required for a relational table (by not allowing records with duplicate values in the key). In a preferred embodiment, keyed tables are supported internally through use of indexes, which will now be described.

3. Indexes

(a) General

By employing one or more database indexes, the records of a table can be organized in many different ways, depending on a particular user's needs. When a user requests an index, the system creates a file that contains the indexed field's values and their corresponding locations. The system refers to the index file when locating and displaying the records in a table. One can use an index to view the records in a different order from the default order. However, the records remain stored in the same physical location as they were entered.

Figure 1C:
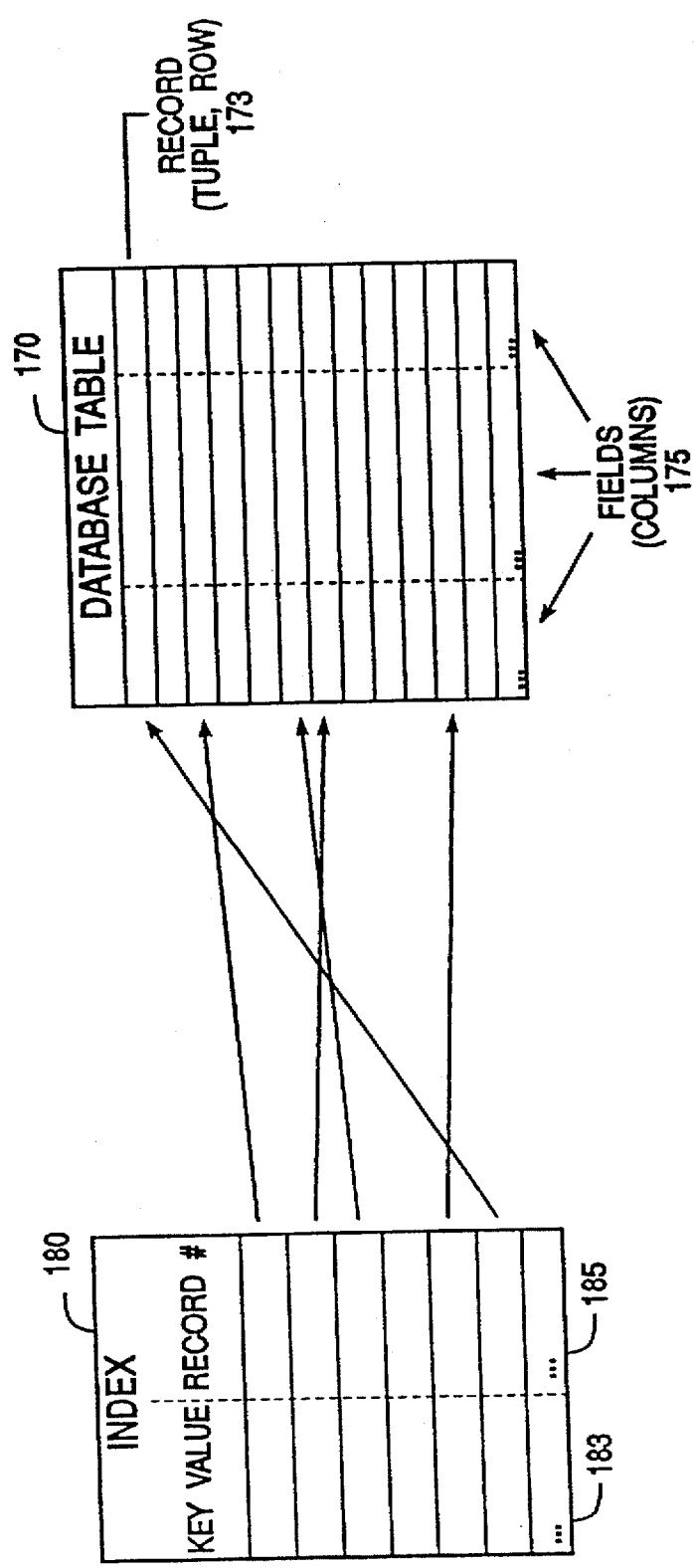
FIG. 1C is a diagram illustrating the conceptual relation between a database table and its index.

As shown by index 180 of FIG. 1C, for example, an index may be constructed as a single disk file which is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searching (querying) for and sorting of information.

(b) Primary Index (key)

The system organizes the records of a keyed table according to the values in the field(s) of the table's key. This is its primary index. By default, all indexes organize and access data in ascending order (A to Z or 0 to 9); a different order may be specified by the user if desired. By requesting an index based on a Last Name field of a table, for instance, the user is instructing the system to organize the table by the values in the Last Name field, that is, an alphabetic sort by last name. If, on the other hand, the user prefers to organize the table by first names, he or she can make First Name the primary index, whereupon the system displays the records according to the value in that field. For a composite key, the system organizes the records by the first field of the key (according to the table's structure), then the next field, and so on.

(c) Secondary Indexes

In addition to specifying a primary index or key for a table, the system of the present invention permits the user to specify one or more "secondary indexes" to define alternate view orders for the table. For example, if the user sometimes wants to view a table by First Name values, but needs to keep the table's key order (e.g., Last Name) intact, he or she can create a secondary index on First Name and use it to temporarily change the view order of the records. When the user views a table using a secondary index, the physical location of the records in the table does not change. Secondary indexes can also be used in linking database tables (as described below).

In a preferred embodiment, secondary indexes can be either automatically maintained or non-maintained. (Primary indexes are always maintained.) When the index is maintained, the system updates the index file whenever the user updates the table. A non-maintained index is not automatically updated when the user updates the table, but the user can open a non-maintained index for use on a table. As in the case of composite primary index, the user can create a secondary index on a group of fields, that is, a composite secondary index. In this manner, the secondary index organizes the data by the first field of the index first, then by the second, and so forth.

4. Referential integrity

If data is to be relied upon for decision-making purposes, data integrity should be assured. Referential integrity assures that a field or group of fields in one table (called the "child" or "detail" table) matches the values in the key of another table (called the "parent" or "master" table). The value found in the child table that matches the key of the parent table is called the foreign key.

Referential integrity provides the user with a way of handling changing values in the parent table that affect the foreign keys in all its child tables. Suppose, for instance, that the user has an Orders table with a Customer No field. The user wants to be very sure the value he or she enters in that field represents a customer who can be found (and billed) in his or her Customer table. To ensure this, Customer No in Orders is defined as a foreign key pointing to Customer. Then, each time the user enters a value in the Customer No field of Orders, the system checks the Customer No field of Customer to make sure the entry is valid.

The system also provides for cascading updates. Suppose the user needs to change a value in a parent table's key. Referential integrity gives the user a way to make the same change in all matching foreign key records of the child table. Using the example of Customer and Orders, suppose the user changes the Customer No value of a record in Customer. Unless one uses referential integrity, all records in the child table (Orders) that belonged to the parent record become orphaned—they are no longer associated with a valid record in Customer. Using referential integrity, the system can cascade the change from Customer to Orders. The system finds all records in Orders that match the changed value in Customer's key and changes them to the new value.

C. Graphical User (Windowing) Interface

1. System UI

Figure 2:
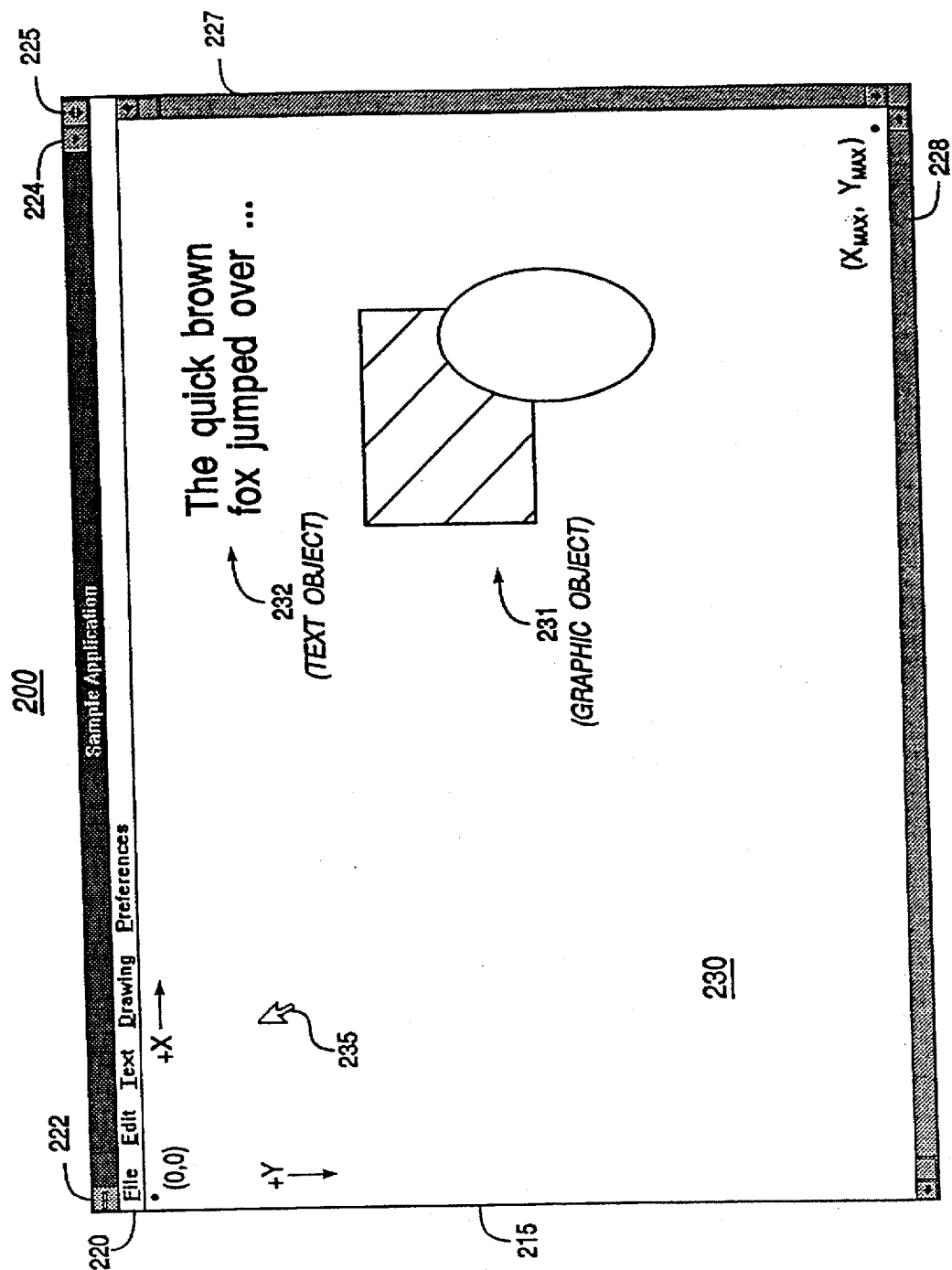
FIG. 2 is a bitmap screenshot illustrating the basic architecture and functionality of a graphical user interface in which the present invention may be embodied.

As shown in FIG. 2, the system 100 typically presents User Interface (UI) 160 as a windowing interface or workspace 200. Window 200 is a rectangular, graphical user interface (GUI) for display on screen 106; additional windowing elements may be displayed in various sizes and formats (e.g., tiled or cascaded), as desired. At the top of window 200 is a menu bar 220 with a plurality of user-command choices, each of which may invoke additional submenus and software tools for use with application objects. Window 200 includes a client area 230 for displaying and manipulating screen objects, such as graphic object 231 and text object 232. In essence, the client area is a workspace or viewport for the user to interact with data objects which reside within the computer system 100.

Windowing interface 200 includes a screen cursor or pointer 235 for selecting and otherwise invoking screen objects of interest. In response to user movement signals from the pointing device 105, the cursor 235 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 200 may be closed, resized, or scrolled by "clicking on" (selecting) screen components 222, 224/5, and 227/8, respectively. Keystroke equivalents, including keyboard accelerators or "hot keys", are provided for performing these and other user operations through keyboard 104.

In a preferred embodiment, GUI 200 is embodied in a message-based windowing environment. The general methodology for creating windowing interfaces and for retrieving and dispatching messages in an event-based GUI system, such as Microsoft Windows, is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference*, Vols. 1 and 2, and 3) *Tools*, all available from Microsoft Corp. of Redmond, Wash. The disclosures of each of the foregoing are hereby incorporated by reference.

2. Desktop UI

Figure 3A:
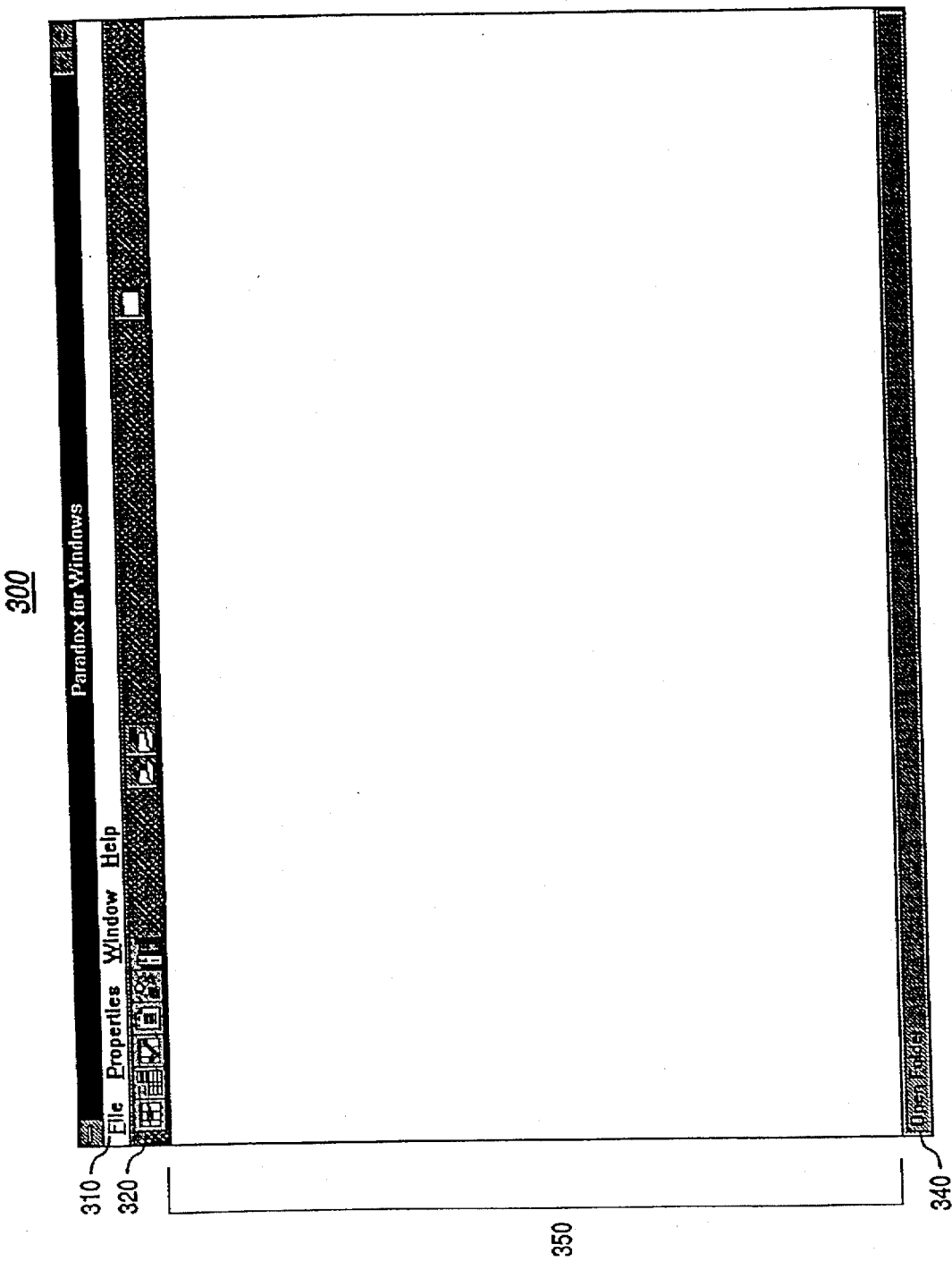
FIG. 3A is a bitmap screenshot illustrating a preferred Desktop or application interface for the system of the present invention.

In addition to the general windowing interface 200 for system 100, a preferred application interface is provided for RDBMS 155. When one starts the RDBMS system, a Desktop interface 300 first appears in display 106, as shown in FIG. 3A. The Desktop is the central working area in the system and serves as a "parent" window to all windows that appear in the system. It is where the user initiates all tasks. All windows are opened on the Desktop and are contained by the Desktop. Using the Desktop, the user can create and modify objects, set preferences, open and close files, and the like.

The Desktop may be divided into functional regions which include a main menu 310, a toolbar 320, a client area 350, and a status line 340. The menu bar 310 contains commands the user can choose to open windows, configure his or her Desktop, and work with his or her data. The menu bar is context sensitive, that is, it contains only the menus one needs at the moment. If a menu is not appropriate for a given task, it does not appear on the menu bar.

Figure 3B:
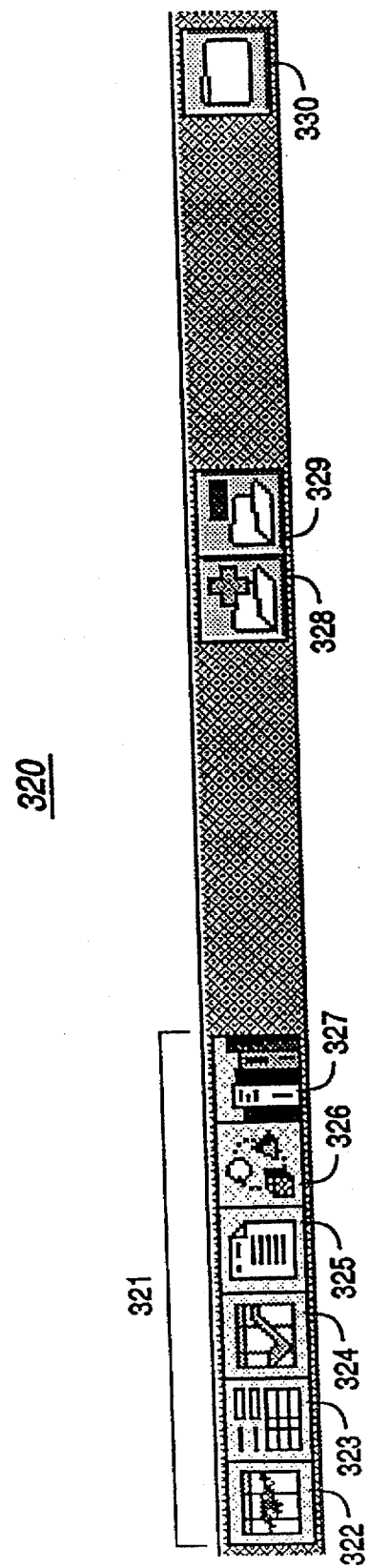
FIG. 3B is an enlarged view of a toolbar from the interface of FIG. 3A.

The toolbar 320 contains shortcut buttons for common menu commands. The toolbar 320, shown in further detail in FIG. 3B, comprises a row or palette of tools which provide a quick way for the user to choose commonly-used menu commands or properties. Like the menu bar, the toolbar buttons change as different windows are opened. To choose a toolbar button, one selects (clicks) it with the mouse. In an exemplary embodiment, the Desktop toolbar 320 includes Open Table 322, Open Form 323, Open Query 324, Open Script 325, Open Report 326, Open Library 327, Add Folder Item 328, Remove Folder Item 329, and Open Folder 330 tools. The same actions are also available as corresponding commands in menus (available from menu bar 210).

The status bar 340 gives a user information about the task he or she is working on and the current state of the system. Like the menu bar and the toolbar, the appearance of the status bar changes as one works. As with the interface 200, standard Windows controls, like the title bar, the borders, the Control menu, the Maximize button, and the Minimize button are provided to let a user control the shape, size, and position of the Desktop.

Desktop 300 includes a client area 350, which functions in a fashion similar to that for the above-described Windows interface 200 (in FIG. 2) for displaying and manipulating screen objects of interest. In addition to simple text and graphic objects, the system provides the user with a set of sophisticated objects for storing and presenting his or her data. These will now be described in turn.

3. System Objects (a) Tables and Design Documents

Figure 3C:
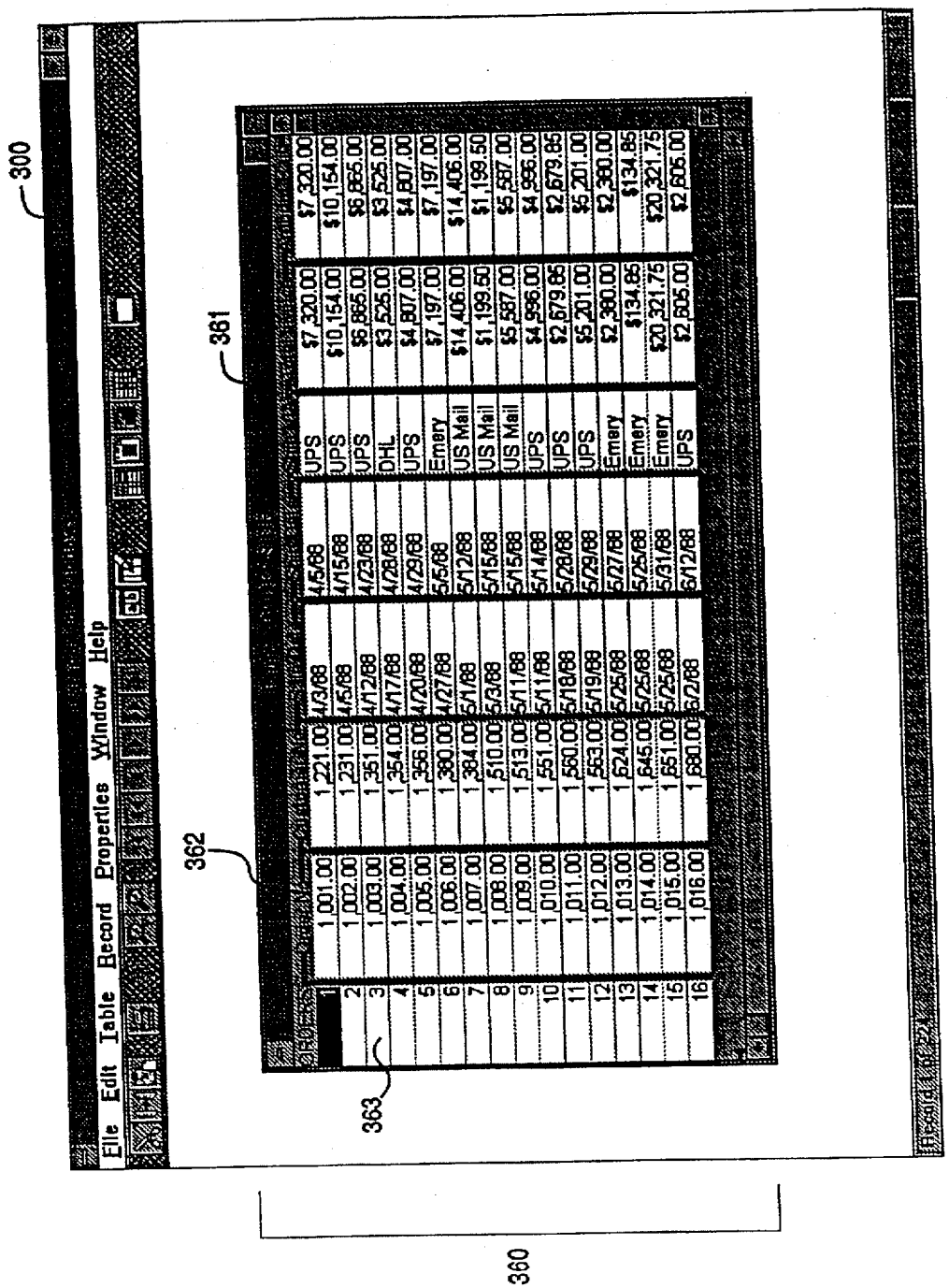
Figure 3D:
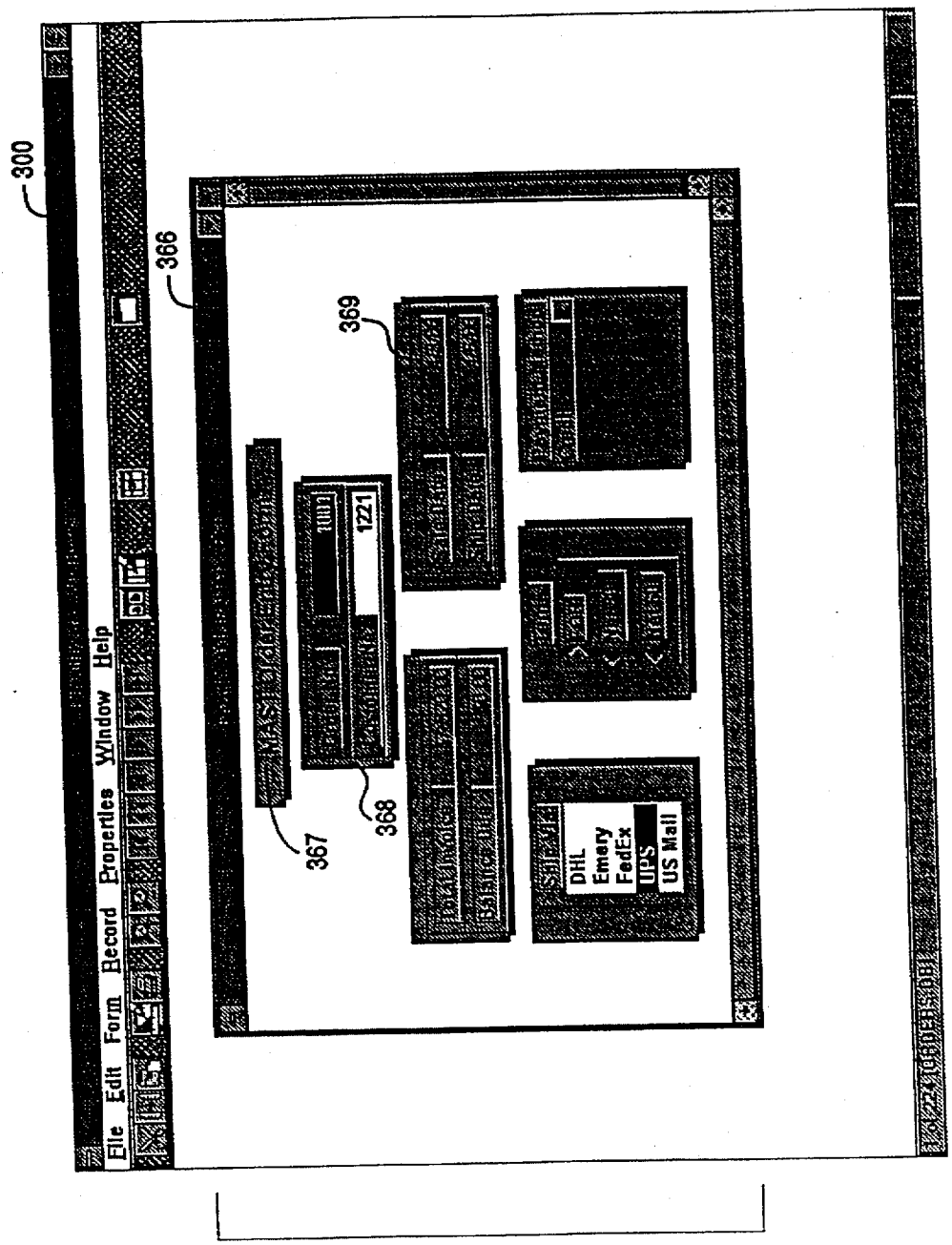
Figure 3E:
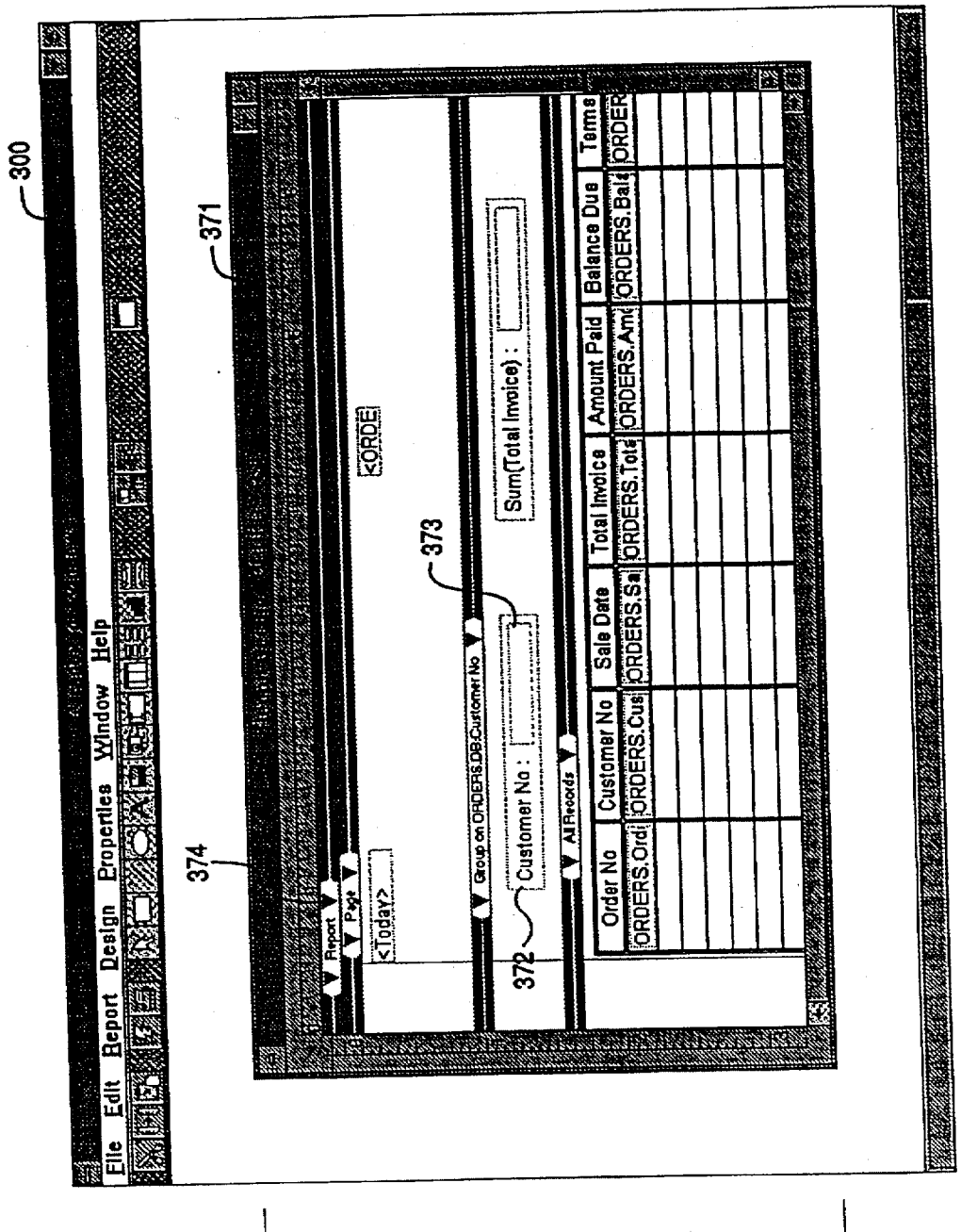

The system provides a set of objects including table, form, report, query, script, and library objects. As shown in FIGS. 3C–E, each type of major object in the system appears in its own type of window within the client area 350 and is itself comprised of objects. Table 361, for example, appears in a Table window 360; it comprises row and column objects 362, 363. Form 366 appears in a Form window 365 and includes (among other objects) an edit field object 369, a box object 368, and a text object 367. Similarly, Report 371 appears in a Report window 370 and includes, for instance, a report band object 374, a field object 372, and an edit field 373 (contained within the object 372). Each type of window includes specialized commands and functions that apply only to that type.

The Desktop 300 contains all windows; here, the commands and functions of the Desktop remain available to all the objects. Once one learns to work with one type of object, he or she can work with similar objects. For example, when the user knows how to edit tables using Table windows, he or she can also edit tables using Form windows. When one knows how to design forms, he or she has the basics of designing reports.

While tables (e.g., Table 361) are the objects that users will use the most in the system, users will often want to display information in a format which is not tabular. For this purpose, the system provides "design document" objects. Form 366 and Report 371 are design documents for instance. Each allows the user to customize how the user's data are presented.

The system of the present invention provides forms and reports as design documents that can present a user's data in a variety of formats. For instance, a user can create design documents that display one record at a time, display multiple records at a time, display only certain fields of a table, display design features (e.g., lines, boxes, graphic images, shading, or special colors), and the like. Design documents can also link together different tables, so that information stored in separate tables appears to the user to come from one place.

Forms and reports differ as follows. Forms are editing tools which let the user display and edit data in his or her tables. The user can, for example, create forms that add data to several tables at once. Reports, on the other hand, are printing tools. They allow the user to format and print his or her data. A user can, for example, use reports to create form letters, mailing labels, invoices, and the like. Unlike forms, reports cannot change the data in a user's table (though they can change the way his or her data appears on a final report).

To create a new design document, the user proceeds as follows. First, the user opens a design window for the type of document desired. For a form object, for instance, the user would open a form window (e.g., Form Window 362). Next, the user places the objects he or she needs on the document. Finally, the user changes the property of the objects on the document until they appear as desired.

Underlying the design document is one or more tables that contains the data which the user wishes displayed on screen or printed in a report. Thus, the task of creating a design document is one of choosing the table (or tables) that contains the data desired; defining the relationships between tables (in the instance of a multitable design document), specifying the fields desired to be displayed in the design; and choosing an initial design layout for the document.

(b) Creating tables

The creation of information tables and design documents will be illustrated for a small sales order-management database, which is sophisticated enough to demonstrate the elements of creating a relational model, but is sufficiently simple for clarity. The database includes a plurality of information tables 375 as shown in FIG. 3F. It includes a Customer table (CUSTOMER.DB) for storing customer data, and includes an Orders table (ORDERS.DB) for storing information about each order made by a customer. As shown, each of these two tables includes a common field: Customer No. The two tables may, therefore, be linked through this common field. Moreover, to maintain integrity of the Orders table, no order should be accepted for a customer which does not exist; in other words, the Orders table is preferably dependent on the Customer table (in a child-to-parent or detail-to-master relation).

Just as the Orders table may depend from the Customer table, the Orders table itself may have several tables depend from it. Thus, as shown in FIG. 3F, the database also includes a Line Item table (LINEITEM.DB), a Stock table (STOCK.DB), and a Vendors table (VENDORS.DB). The Line Item table serves to store each line of information of each order; thus, each entry in the Line Item table references the Orders table through a common field, the Order No. Each entry in the Line Item table includes a Stock No, thus referencing an entry in the Stock table. Each entry in the Stock table includes a Vendor No, for referencing a particular entry in the Vendors table.

Figure 3G:
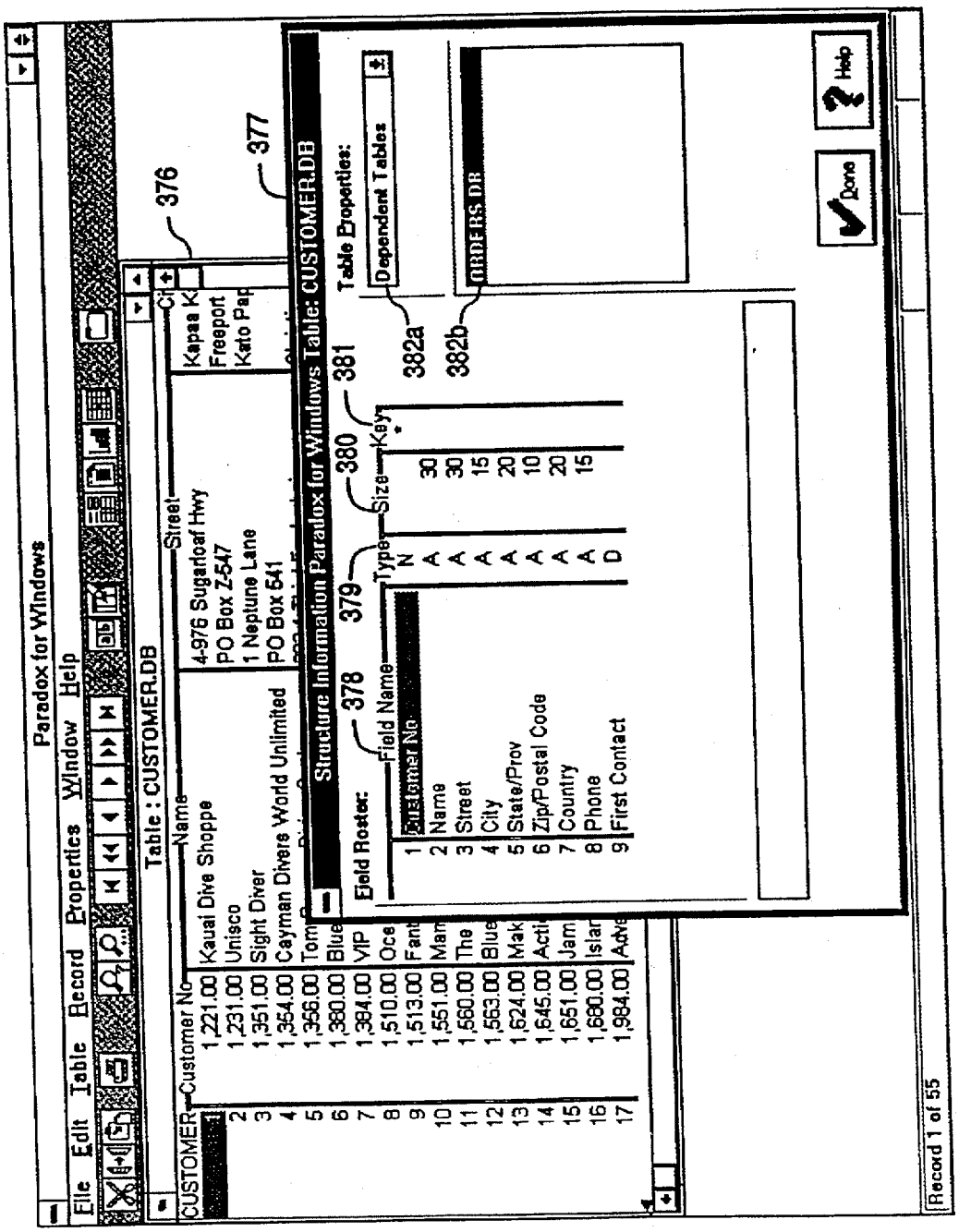

To create these tables, the user specifies a structure for each. The structure includes information about the name of each field, its type, and its size (if necessary). As shown for the Customer table 376 of FIG. 3G, for instance, the table has been defined with a structure as shown by the structure information dialog 377. Each field has been given a field name 378, a type 379, and a size 380 (if necessary). In addition, the user may select one or more fields to serve as a key 381 (or no fields in the instance of an unkeyed table).

Also shown, the dialog 377 includes a table properties list 382a. With the property list set to show dependent tables, a display list 382b indicates that the Orders table is dependent upon the Customer table (as will be described in further detail).

Figure 3H:
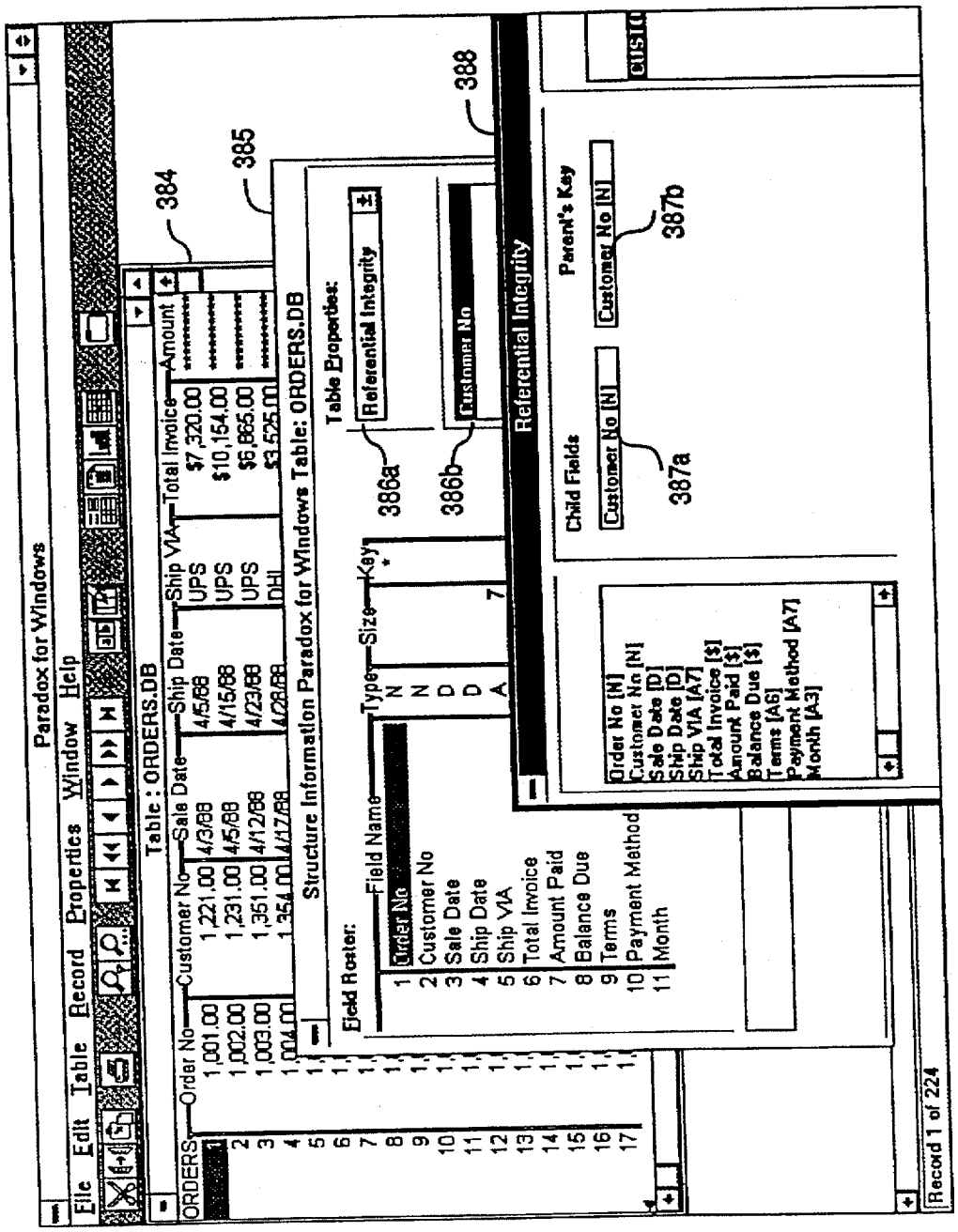
Figure 31:
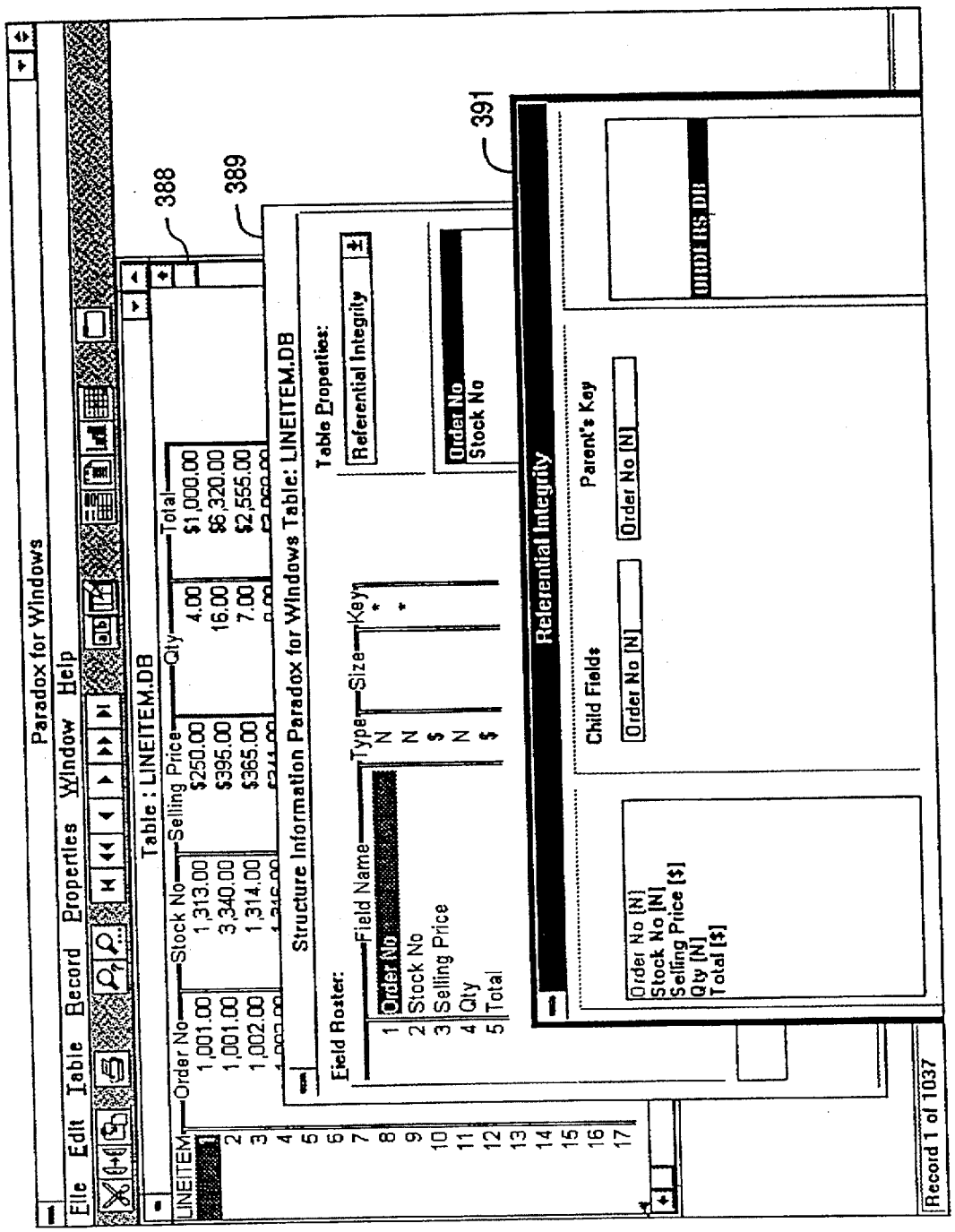

The structure for the Orders table 384 is shown in structure information dialog 385 of FIG. 3H. As before, appropriate information has been entered for field name, type, and size. Also shown, the table has been keyed by Order No. From the table properties list 386a, the user has specified a referential integrity check for the Customer No field (which now appears also in the list 386b). In response to the request, the system displays a Referential Integrity dialog 388. As shown by the child fields list 387a, the user has selected the Customer No field from the Orders table 384 to match a parent's key of Customer No (shown in a parent's key list 387b), thus linking the Orders table 384 to the Customer table 376. Operation of the Referential Integrity dialog is described in further detail hereinbelow.

Figure 3J:
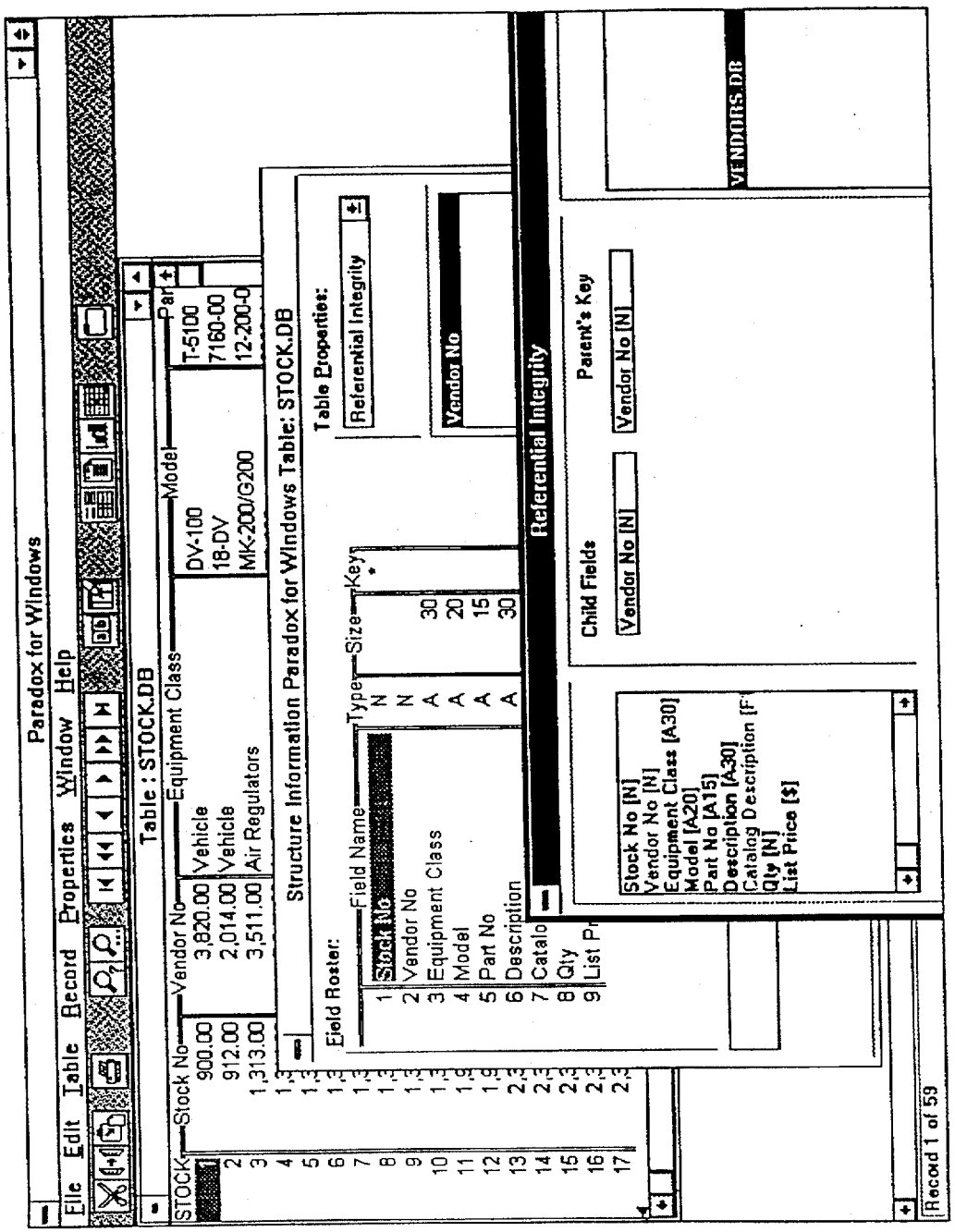
Figure 3K:
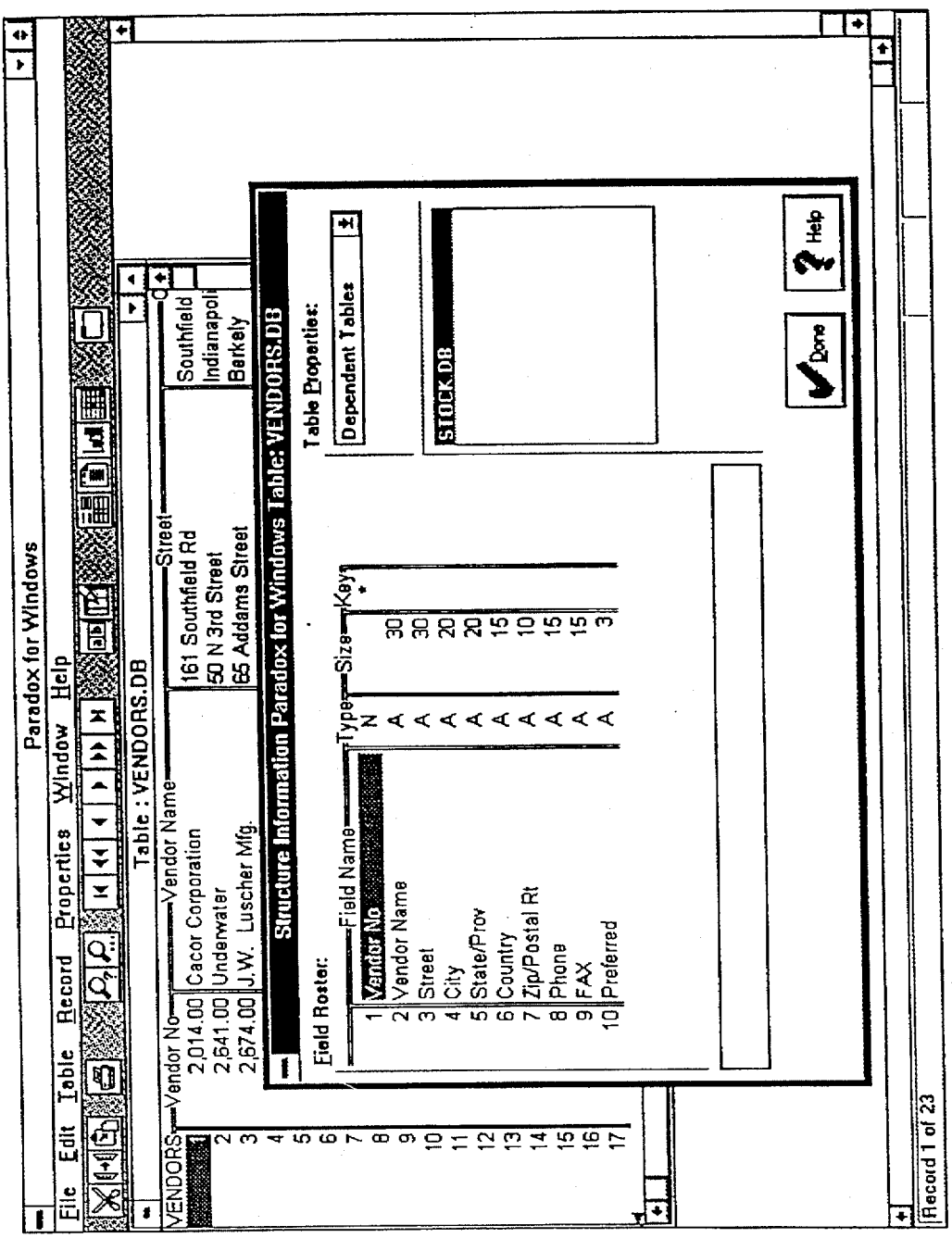

As shown in 3I–K, Line Item, Stock, and Vendors tables are structured in a like manner. Line Item table 388 includes a structure as shown in dialog 389, with referential integrity checks defined on its Order No and Stock No fields (e.g., the Order No field is linked to the Orders table as shown in the referential integrity dialog 391). Structures for the Stock and Vendors tables are shown in FIGS. 3J and 3K, respectively.

PC DBMS Referential Integrity

Often, a user wants to specify that a field value entered in one table (the child table) must already exist in a specified field of another table (the parent table). This concept is called referential integrity—a way of ensuring that the ties between like data in separate tables cannot be broken. The RDBMS 155 provides for referential integrity between data tables, as will now be described in further detail.

A. Preferred User Interface

Figure 4A:
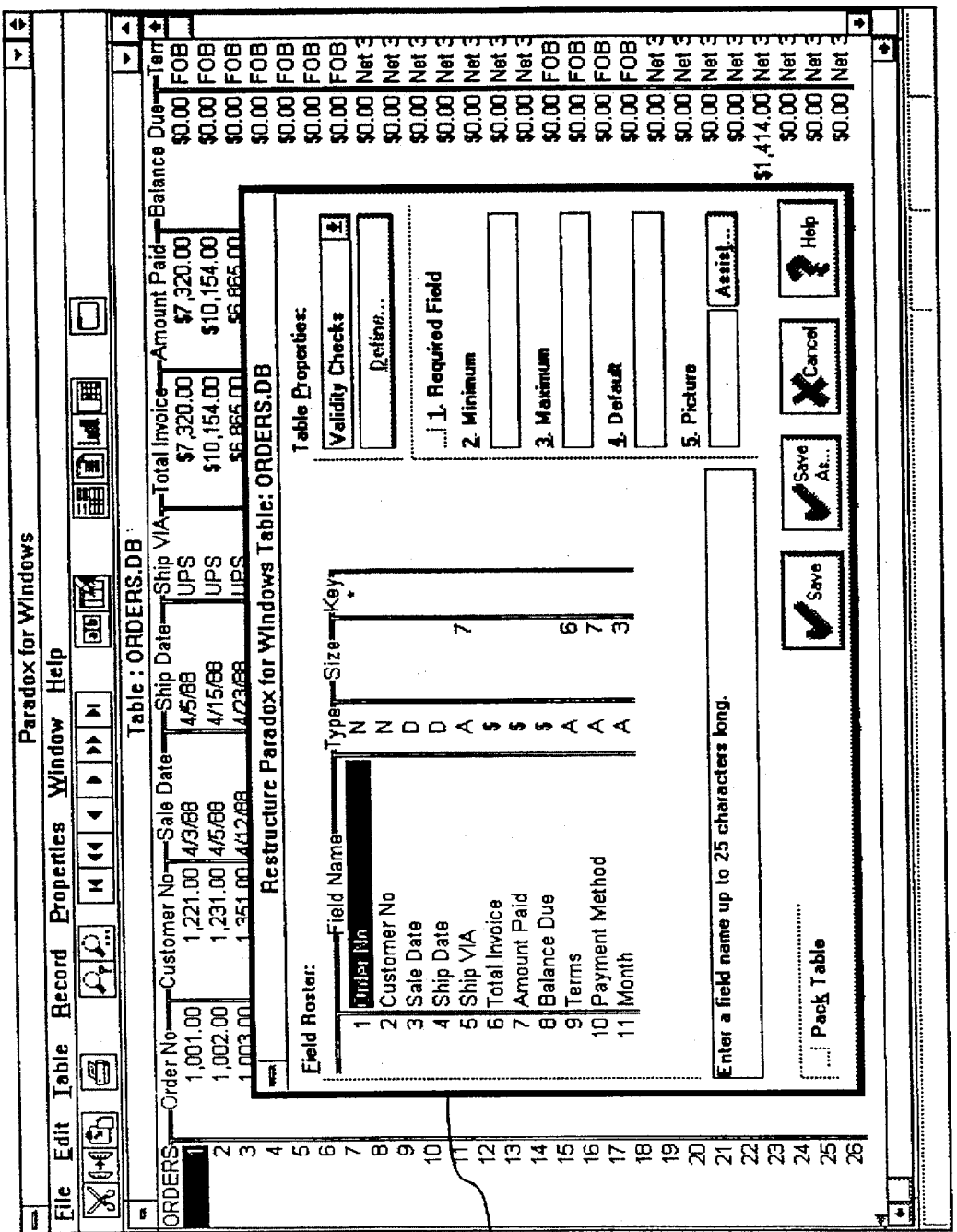
FIGS. 4A-D are bitmap screenshots illustrating a preferred interface of the present invention for defining referential integrity links between data tables.
Figure 4B:
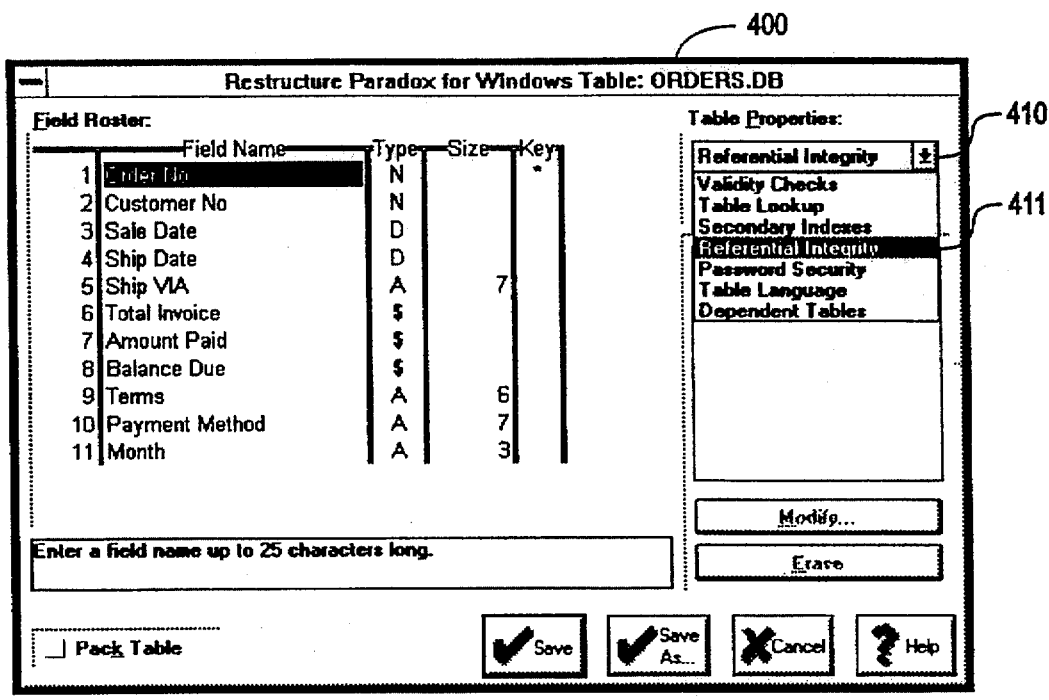
Figure 4C:
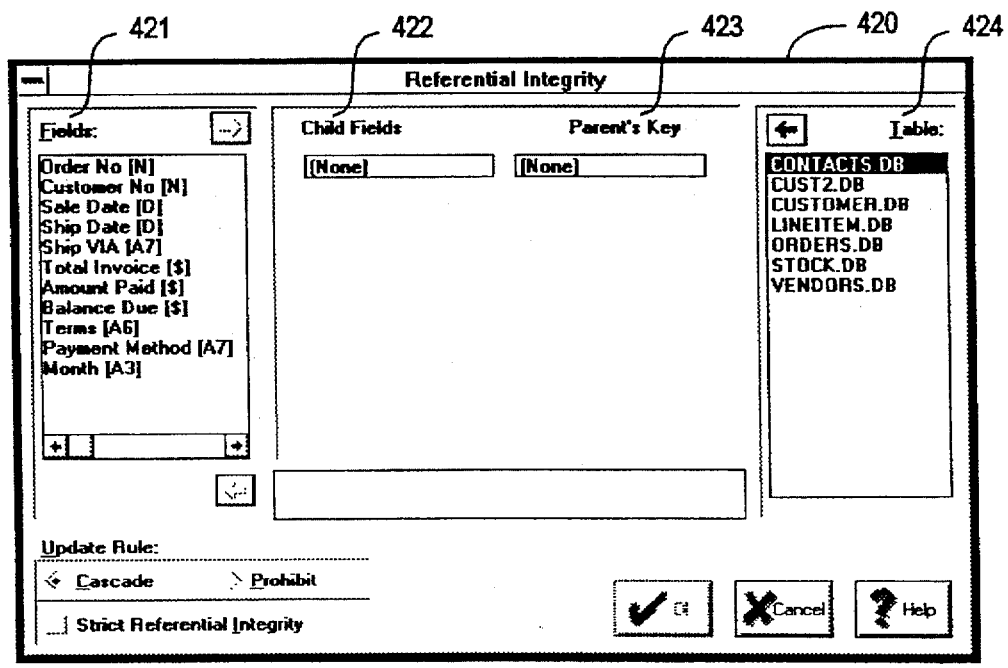

Referring now to FIGS. 4A–D, a preferred interface for defining referential integrity between data tables will now be illustrated in further detail. First, the user displays the structure of the table in the Create Table dialog box or the Restructure Table dialog box, such as the Restructure Table dialog box 400 shown in FIG. 4A. As shown in FIG. 4B, the dialog 400 includes a Table Properties drop-down list 410; from the list 410, the user chooses Referential Integrity 411. In a preferred embodiment, the user specifies a primary key for a table before he or she can add referential integrity. Upon the user selecting Referential Integrity 411, the system opens a Referential Integrity dialog box 420, as shown in FIG. 4C.

The Referential Integrity dialog box 420 allows the user to define a referential relationship between two tables. First, the user selects a field 421 from the table he or she is creating or restructuring (the child table), then selects a table 424 containing all valid values for the selected field (the parent table). The system displays all the fields from the table the user is working with (the referential integrity table). The user chooses the field he or she wants to look to the parent table for its values; then click the Add Field arrow (or press Alt+A). The field appears in the Child Fields section 422 of the diagram. To remove a field from the diagram, the user selects the field, then clicks the Remove Field arrow (or press Alt+R). The fields one selects from the Fields list appear in this area of the referential integrity diagram.

Figure 4D:
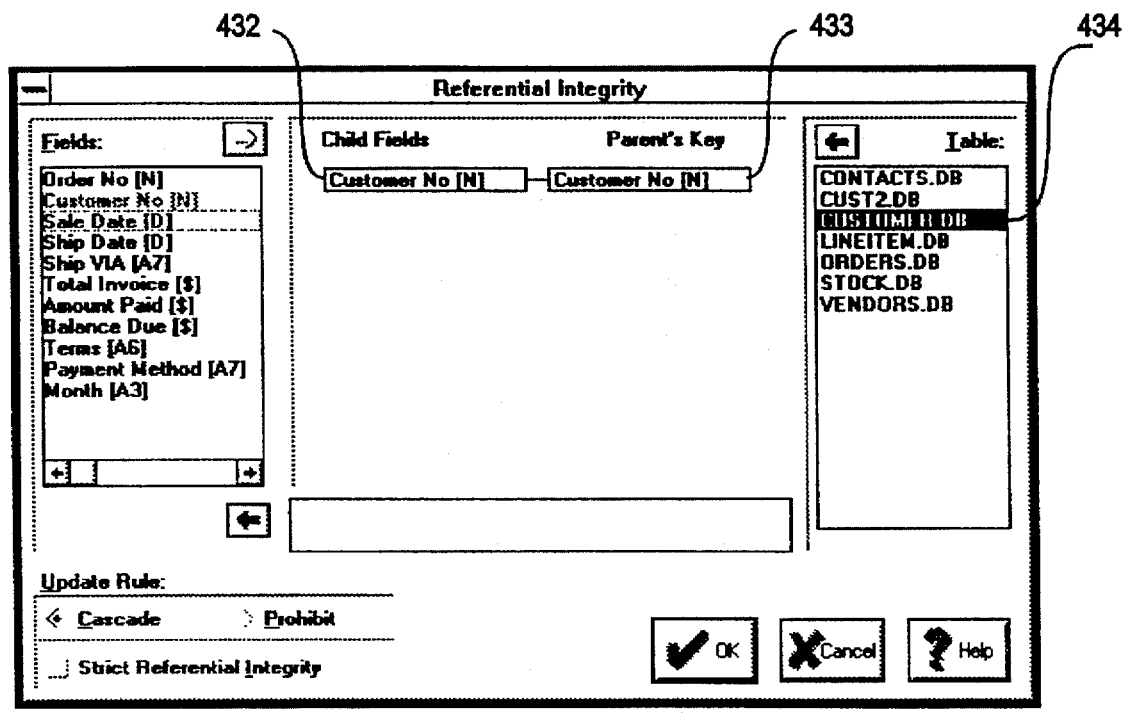

The system displays tables from the working directory in the Table list. The user chooses the table he or she wants to be the parent table. The field (or fields) that make up the parent table's key appear in this area of the referential integrity diagram: the primary key of the selected table becomes the Parent's Key 423. As shown in FIG. 4D, for instance, the Customer No field of the Orders table includes a referential integrity link to the Customer No field of the Customer table. In the event that the table that one. chooses is not keyed, or if there is a problem with the key, a message appears in the dialog box to prompt the user for additional action.

With the Child Fields and the Parent's Key in the diagram area, the user may now choose the update rule desired. The system provides two update rules for tables that use referential integrity, as shown by Update Rules 425. The user may select one of the following rules:

Cascade: Here, any change one makes to the value in parent's Key is automatically made in the table it is linked to by referential integrity. Cascade is system's default update rule.

Prohibit: Here, the user cannot change a value in the parent's key if records in the key match the value in the child table. For example, if the value 1356 exists in the Customer No field of Orders, the system prohibits the user from changing that value in the Customer No field of Customer. (The user can change it only if he or she first deletes or changes all records in Orders that contain it.) If the value does not exist in Orders, the system permits the change in Customer.

The dialog 420 includes a Strict Referential Integrity option for compatibility with earlier versions of the system (Paradox).

Figure 5:
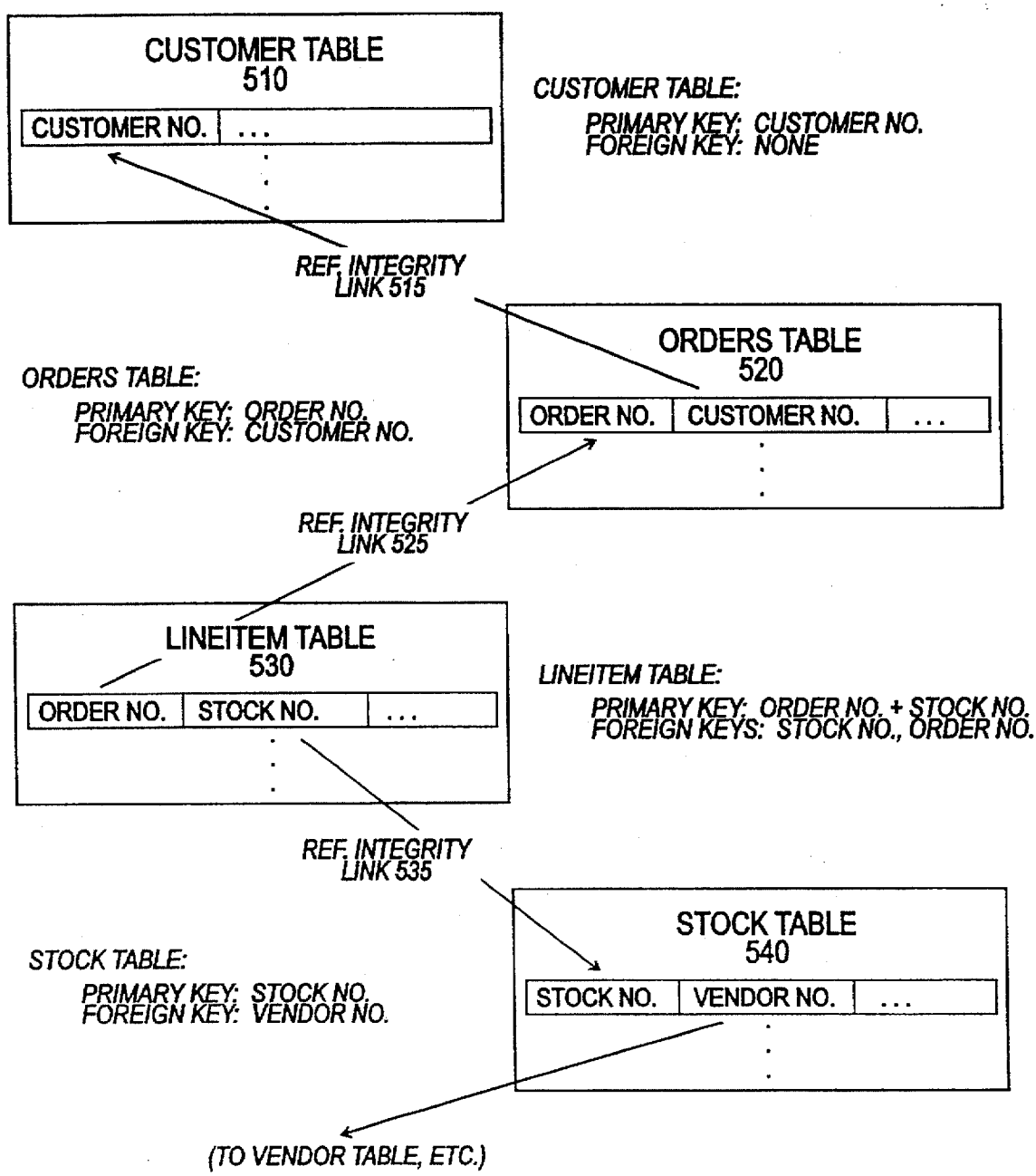
FIG. 5 is a block diagram illustrating exemplary referential integrity links between data tables, such as the data tables of FIG. 3F.

As shown in FIG. 5, a plurality of referential integrity links may be defined in this manner for the information tables of FIG. 3F (Tables 375). For instance, a referential integrity link 515 may be defined linking the Customer No field of Orders table 520 to the Customer No field of Customer table 510. Here, Customer No field of Orders table 520 is a "foreign key" linking the table to the primary key of the Customer table 510 (i.e., Customer No of the Customer table). The foreign key is the primary key of another table—the table which is to serve as the integrity reference. The Orders table 520 in turn includes a primary key, Order No, which may be used by the referential integrity link 525 to link the Lineitem table 530; the Order No field of the Lineitem table functions as a foreign key to link the two tables. As a final example, the Lineitem table 530 is linked to the Stock table 540 via referential integrity link 535, the Stock table primary key (Stock No) matching the Lineitem table foreign key (Stock No). Once the user has established referential integrity between two tables, the system automatically links them according to the referential integrity specification.

Defining a referential integrity rule assures that all related records are handled in a consistent manner during data entry. For instance, if the Customer table (the parent) has orders associated with it in the Orders table (the child), referential integrity assures that no order record exists in the Orders table that does not have a Customer record associated with it. Orphaned orders are not allowed. If the user defines referential integrity on a table that already contains data, the system places existing child records with no parent into the temporary Keyviol table in the user's private directory.

B. Internal Operation

Data entry in either forms or tables must follow the rules of referential integrity which have been established. When the user sets a referential integrity rule, the rule is bidirectional, meaning that data entry or changes on either table associated with the rule follows that rule. The referential integrity rule is maintained by the system in separate "value checks" for each table. Each "value check" may be stored as part of a table (e.g., in a header, or as a special record) or, in a preferred embodiment, stored as part of a "value check" (.VAL) file for a particular family of database objects. Family members include a database table and its related objects, such as forms, data validation, reports, indexes, and the like. The base name of the database table identifies all related members of a given family. A Customer table (e.g., customer.db) may have associated with it a customer form (e.g., customer.f) and a customer "value check" or data validation file (e.g., customer.val).

Figure 6:
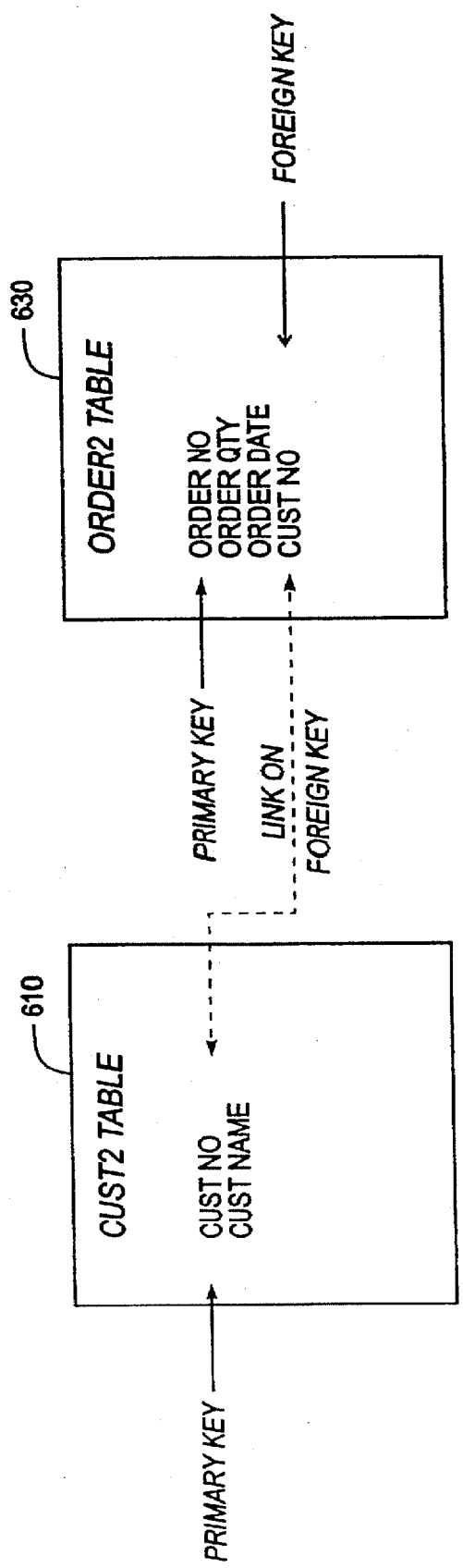
FIG. 6 is a block diagram illustrating a single referential integrity link between a table storing customer information (Cust2 Table) and a table storing order information (Order2 Table).

With reference to FIG. 6, the construction and operation of the "value check" (.VAL) file which is employed for maintaining referential integrity in a preferred embodiment will now be described in further detail. FIG. 6 shows two tables: Cust2 table 610 and Order2 table 630. The Cust2 table 610 includes a Cust No field and a Cust Name field; the former serves as the primary key for the table. The Order2 table 630, on the other hand, includes Order No, Order Qty, Order Date, and Cust No fields; Order No serves as the primary key for the table. As shown, the two tables may be linked through a foreign key on Cust No. The property of the foreign key is that it is the (complete) primary key of another table.

As shown, the primary key for the Order2 table 630 is independent of the foreign key. Thus, the foreign key for the Order2 table 630 can be selected from any field of the table; the only requirement is that it satisfy the primary key of another table. For performance reasons, a secondary index would be built on the Cust No field of the Order2 table in a preferred embodiment.

Figure 7A:
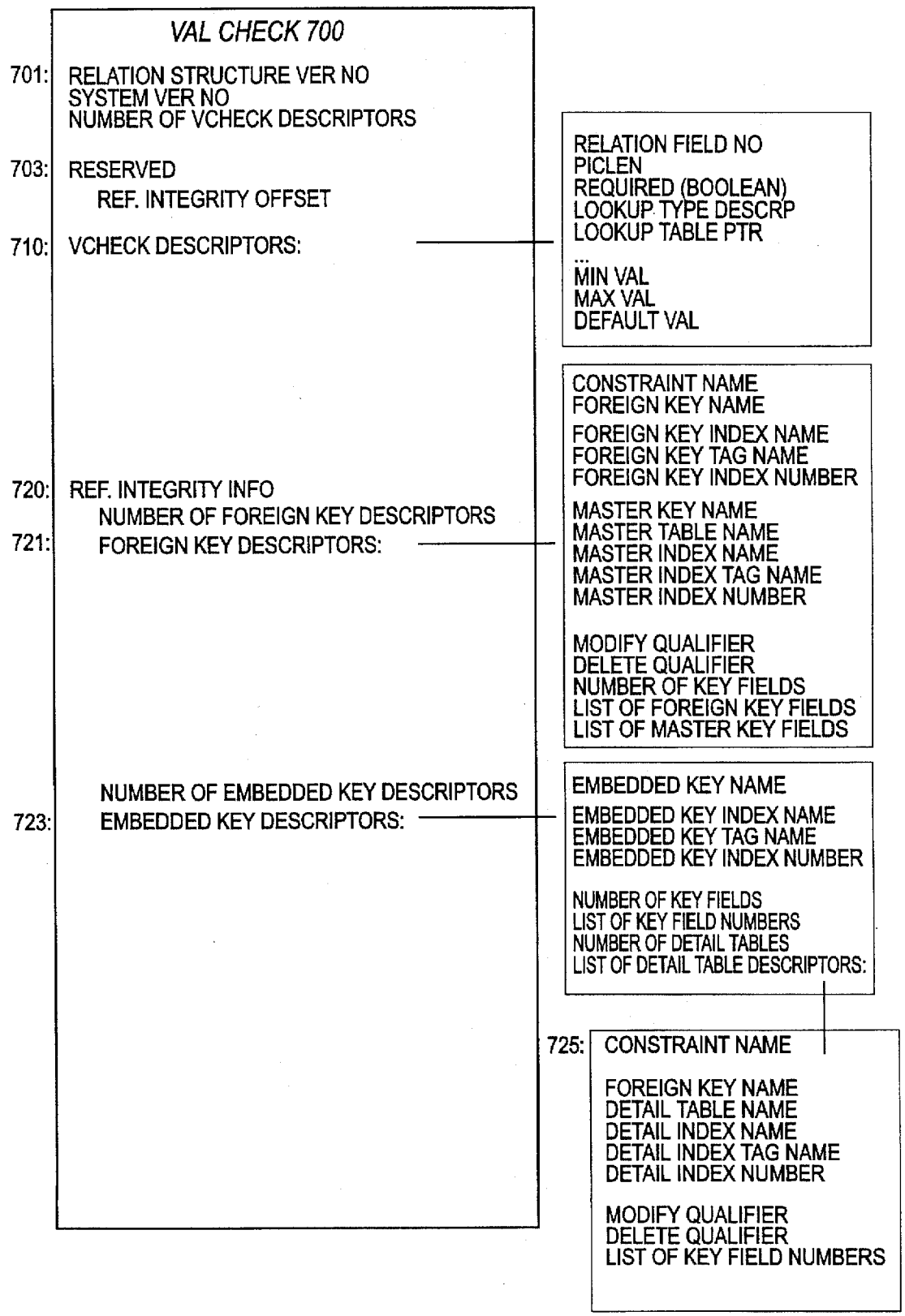
FIG. 7A is a block diagram illustrating the structure and layout of a value (.VAL) check file, which the system maintains for each data table.

Referring now to FIG. 7A, maintenance of referential integrity between data tables will now be described. In implementing a PC DBMS, a designer does not have the luxury of relying on a centrally maintained catalog (of all data tables and their dependencies). Therefore, according to the present invention, referential integrity information for each table is maintained in the .VAL (value) Check file 700. In this manner, referential integrity for a table is maintained with the table, regardless of where the table is located (e.g., moved to a remote workstation).

As shown in FIG. 7A, the structure of the Val Check file 700 is as follows. The file includes a first section 701, which comprises a Relation Structure Version Number, a System Version Number, and a Number of Vcheck Descriptors. This is followed by a Reserved section 703, which includes the address (offset) to the beginning of the Referential Integrity Information. Next, a list of Vcheck Descriptors 710 follows. Each descriptor comprises Relation Field Number, Piclen (picture length), Required (i.e., whether the field requires a value for completeness), Lookup Type Descriptor, Lookup Table Pointer, Minimum Value (that is acceptable), Maximum Value (that is acceptable), and Default Value.

At section 720, the Referential Integrity Information itself is defined. The section comprises two subsections: Foreign Key Descriptors 721 and Embedded Key Descriptors 723. The system must track for each table all the Master tables (that point to it) and all the Detail tables (which depend from it). The technique for tracking each type of table will now be examined in turn.

The Master tables for a given table are described by the Foreign Key Descriptors 721. For the example at hand, the Order2 table 630 of FIG. 6, the number of foreign keys is 1. For the Line Item table 530 of FIG. 5, on the other hand, the number is 2. Each Foreign Key Descriptor itself comprises the following members: Constraint Name, Foreign Key Name, Foreign Key Index Name, Foreign Key Tag Name, Foreign Key Index Number, Master Key Name, Master Table Name, Master Index Name, Master Index Tag Name, Master Index Number, Modify Qualifier, Delete Qualifier, Number of Key Fields, List of Foreign Key Fields, and List of Master Key Fields. The Constraint Name is the name assigned by the user for each foreign key link or "constraint." This descriptive name permits the user to easily identify different links (e.g., for modifying or deleting). Similarly, the Foreign Key Name may be a system-maintained descriptor of the link; it may be optionally employed. Next, the Foreign Key Descriptor stores information identifying the Index for the Foreign Key; for compatibility with dBASE®, an Index Name and Tag Name may also be maintained.

Following the Foreign Key information is information about the Master Table itself. Here, the Foreign Key Descriptor stores Master Table Name, Index Name, Index Tag Name, and Index Number members. The Key Name for the master may also be stored. The Master Table Information is followed by qualifiers which specify whether records in the table may be modified (Modified Qualifier) or deleted (Delete Qualifier). Finally, the List of Foreign Key Fields stores a list of one or more fields in the detail which support the foreign key. The List of Master Key Fields stores a corresponding list of one or more fields in the Master Table which contribute to the primary key (which the link is defined on).

Using the C programming language, a Foreign Key Descriptor may be constructed with the following structure:

```
typedef struct ForiegnKD
{
CHAR            szRintName [MAXNAMELEN+1];          //Identifies
                                                    the Desc.
CHAR            szFKeyName [MAXNAMELEN+1];
CHAR            szFKeyIndexName [MAXPATHLEN+1];
CHAR            szFKeyTagName [MAXNAMELEN+1];
INT16           iFKeyIndexNum;
TableIndexDesc  TIDMasterTable;                     // Master
                                                    Table
                                                    Descriptor
RINTQual        eModOp;
RINTQual        eDelOp;
INT16           iNumKeyFields;
INT16           aiFKeyFields [MAXFLDSINKEY];        // The
                                                    foriegn
                                                    key fields
INT16           aiMKeyFields [MAXFLDSINKEY];        // The
                                                    master
                                                    key fields
} ForiegnKD;
where TableIndexDesc is defined as:
typedef struct TableIndexDesc    // Table and Index Descriptor
{
CHAR            szKeyName [MAXNAMELEN+1];
CHAR            szTableName [MAXPATHLEN+1];
CHAR            szIndexName [MAXPATHLEN+1];
CHAR            szTagName [MAXNAMELEN+1];
INT16           iIndexNum;
} TableIndexDesc;
```

With additional reference to FIG. 7B, the structure of the Referential Integrity Information 720 for the Order2 table 630 (of FIG. 6) will now be described. The Number of Foreign Key Descriptors is set to 1, as there is only one Master Table (Cust2 table 610). The single Foreign Descriptor 721 for the table will be structured as follows. Constraint Name is set to the user-specified name (e.g., "Custord"). Next, the Foreign Key Index Number is set equal to the identifier for the secondary index on Cust No for the Order2 table, which is automatically created as described above; this functions as the Foreign Key. (Internally, the system tracks indexes via index identifiers. For instance, the first index, such as for the primary key, is index 0 (shown as IDX_0 in the figure), the next index is index 1, and so forth.) When the Master Table (Cust2 table) is opened, a cursor is established on the Detail Table (Order2 table) using this index.

Continuing with completing the Foreign Key Descriptor, the Master Table Name is set to "Cust2" for referencing the Cust2 table 610; here, the directory is assumed to be the same as that of the table. The Master Index Number is set to the identifier of the index supporting the primary key of the Cust2 table; typically, the identifier for the index supporting the primary key has an index number of 0 (i.e., the primary key is treated as the base), as described above.

The Modify and Delete Qualifiers are set based upon whether referential integrity is defined to be "cascade" or "restrict." This will determine whether changes to Customer No in the Master Table (Cust2 table 610) cascade (propagate) to the Detail Tables, such as Order2 table 630. Restrict, on the other hand, disallows changes to Cust No if dependent records (in a detail table) exist. Cascade and restrict may be implemented for both modify and delete operations.

Number of Key Fields specifies how many fields of the Order2 table 630 are employed for the foreign key; since a single field (Cust No) is employed, the number is set equal to 1. The Foreign Key Descriptor stores a List of Foreign Key Fields and a List of Master Key Fields. For the table 630, the List of Foreign Key Fields stores a single identifier, for identifying the Cust No field (i.e., the single field used to construct the foreign key). In a corresponding manner, the list of Master Key Fields stores a single identifier for the Cust No field of the table 610, for specifying the single field which is used to construct the primary key (which the foreign key matches on).

Figure 7B:
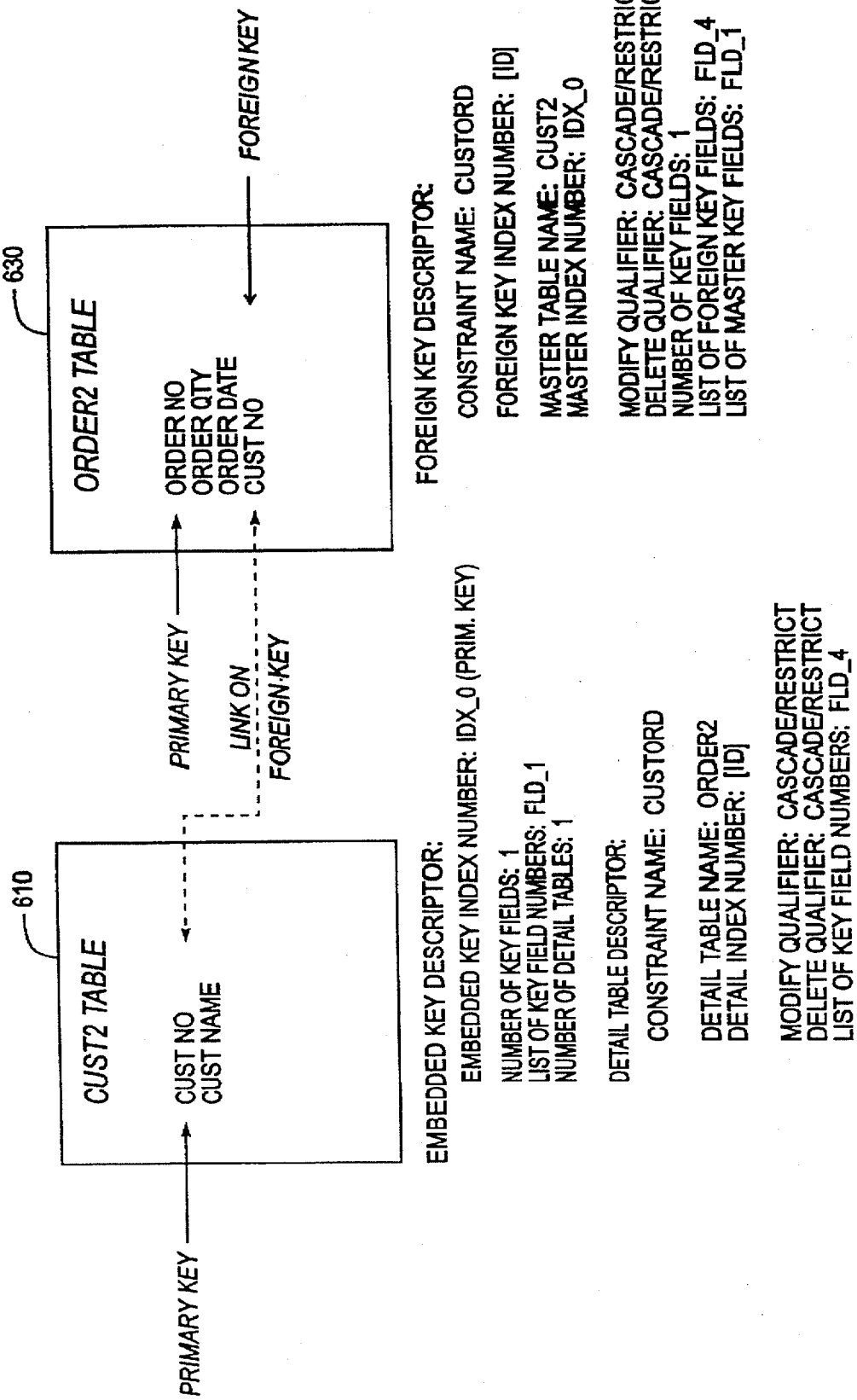
FIG. 7B is a block diagram illustrating completion of foreign key and embedded key descriptors (stored in the .VAL file), for the data tables of FIG. 6.

As shown in FIG. 7B, the Embedded Key Descriptor for the table 610 stores information which complements that stored in the Foreign Key Descriptor of the table 630. In particular, the Embedded Key Descriptor tracks an Embedded Key Index Number, a Number of Key Fields, a List of Key Field Numbers, a Number of Detail Tables, and one or more Detail Table Descriptors. In the C programming language, an Embedded Key Descriptor may be constructed with the following structure:

```
typedef struct EmbKD
{
CHAR     szEmbKeyName [MAXNAMELEN+1];      //Embedded Key Name
CHAR     szEmbKeyIndexName [MAXPATHLEN+1];
CHAR     szEmbKeyTagName [MAXNAMELEN+1];
INT16    iEmbKeyIndexNum;
INT16    iNumKeyFields;                    // No. of key fields
INT16    aiKeyFields [MAXFLDSINKEY];       // The key fields
INT16    iNumDetailTables;
} EmbKD;
```

The Detail Table Descriptor itself may be constructed as follows.

```
typedef struct DetailTableDesc
{
CHAR            szRintName [MAXNAMELEN+1];   //Identifies the Desc.
TableIndexDesc  tid;                          // (defined above)
RINTQual        eModOp;
RINTQual        eDelOp;
INT16           aiFKeyFields [MAXFLDSINKEY]; // The key fields
} DetailTableDesc;
```

For the table 610, the Embedded Key Descriptor sets the Embedded Key Index Number to zero (i.e., indicating the primary key). The Number of Key Fields is set to 1, since a single field contributes to the primary key (i.e., it is not a composite key). The Number of Detail Tables is set to 1, since there is only one detail table (Order2 table 630).

Figure 7C:
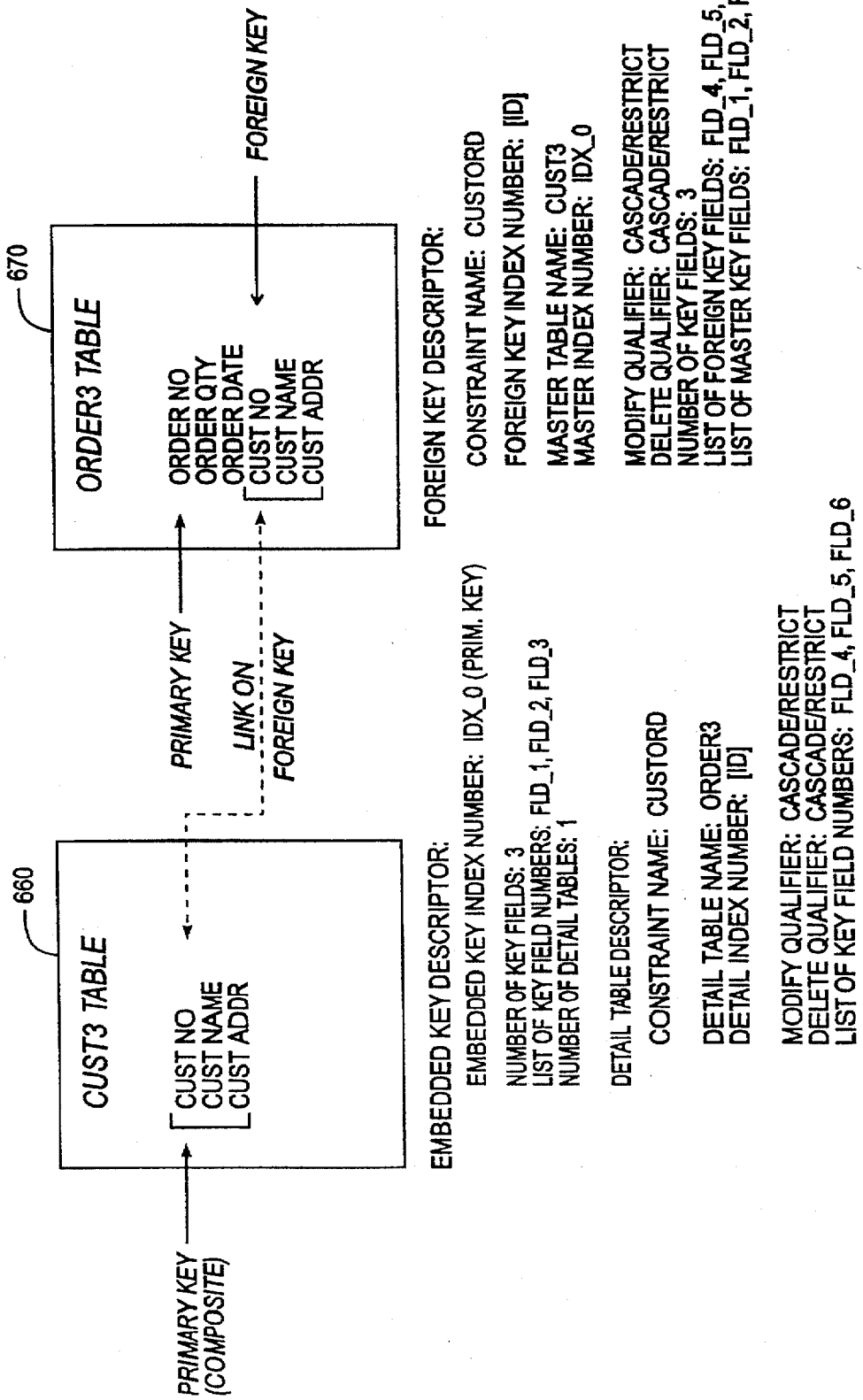
FIG. 7C is a block diagram illustrating completion of foreign key and embedded key descriptors for a data table having a composite primary key and corresponding composite foreign key.

Next, the Detail Table Descriptor is stored with the following information. The Constraint Name is set to the user-specified text string (e.g., Custord). The Detail Table Name is set to Order2. The Detail Index Number is set to the identifier for the Cust No secondary index (of the Order2 table). The Modify and Delete Qualifiers are set to either Cascade or Restrict, as before. Finally, the List of Key Field Numbers stores the number 4, thereby indicating that the key field of the Detail Table is the fourth field (i.e., Cust No of Order2 Table 630). FIG. 7C illustrates the construction of an Embedded Key Descriptor and corresponding Foreign Key Descriptor for a multi-field (composite) Foreign Key Link, such as between Cust3 Table 660 and Order3 Table 670.

At runtime, integrity information is preferably verified during a data record INSERT, DELETE, or MODIFY operation. In a preferred embodiment, a VerifyIntegrity function is employed as shown by the following pseudocode.

```
VerifyIntegrity{pRecBuffer, // Record Buffer pointer
    OpCode, // Opcode - INSERT/DELETE
    RecCheckDesc // Record Check Descriptor
    };
{
    If OpCode == INSERT
    {
        // First verify that val checks are satisfied.
        For each field with low/high values specified{
            GetField ();
            Do low/high value checks using data engine types;
            Return error (How?) if val checks fail;
        }
        // Do Ref. Integrity checks
        For each foriegn key descriptor{
            Form the foriegn key;
            Do SetSearchKey on Cursor of Foriegn Table;
            // This cursor will be opened based on the
            // right index when the check descriptor is
            // first built.
            Do a FindNext to verify that the record
            satisfies the key search;
            If Key is not found
                Error;
        }
    }// End Insert
    else{ // OpCode == DELETE or MODIFY
        // Check that candidate keys of record deleted are
        // not involved as a foriegn key in another table
        For each Embedded Candidate Key Descriptor{
            Form the candidate key;
            For Each Table this key is Embedded {
                Do SetSearchKey on Cursor of Table;
                // This cursor will be opened based on
                // the right index when the check
                // descriptor is first built.
```

-continued

```
            Do a FindNext to verify that the record
    satisfies the key search;
        If Key is found
            If (MODIFY and CASCADE)
                Return NEED_CASCADE;
            Else
                Error;
        }
    } // End of Candidate key check
}// End DELETE check
```

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a computer system, a method for maintaining referential integrity among a plurality of data tables stored in a relational database system, the method comprising:
   (a) receiving from a user a request specifying a desired referential integrity link between two data tables, said request designating a master table having at least one field whose values are to serve as a reference, said at least one field serving as a unique key for said master table, and said request designating a detail table having at least one field whose values are required to match reference values in the master table, said at least one field of the detail table serving as a foreign key linking said detail table to the unique key of said master table;
   (b) associating with said detail table a first referential integrity descriptor, said first referential integrity descriptor storing information specifying which index of the detail table supports said foreign key, which table is said master table for the referential integrity link, and which fields of the detail table contribute to said foreign key, said first referential integrity descriptor being stored such that a transfer of said detail table to a remote location includes transfer of said first referential integrity descriptor; and
   (c) associating with said master table a second referential integrity descriptor, said second referential integrity descriptor storing information specifying which fields of said master table contribute to said unique key and further specifying said detail table for the referential integrity link, said second referential integrity descriptor being stored such that a transfer of said master table to a remote location includes transfer of said second referential integrity descriptor.

2. The method of claim 1, wherein said first referential integrity descriptor is stored as a part of said detail table.

3. The method of claim 1, wherein said first referential integrity descriptor is stored on a storage device as an associated file stored together with said detail table.

4. The method of claim 2, wherein each table has a table name and wherein said first referential integrity descriptor is associated with said detail table by assigning the table name of the detail table to said first referential integrity descriptor.

5. The method of claim 1, wherein said second referential integrity descriptor is stored as a part of said master table.

6. The method of claim 1, wherein said second referential integrity descriptor is stored on a storage device as an associated file stored together with said master table.

7. The method of claim 3, wherein each table has a table name and wherein said second referential integrity descriptor is associated with said master table by assigning the table name of the master table to said second referential integrity descriptor.

8. The method of claim 1, wherein said request for a referential integrity link includes a user-supplied descriptive name.

9. The method of claim 8, wherein said user-supplied descriptive name is stored with both the first referential integrity descriptor and the second referential integrity descriptor.

10. The method of claim 1, wherein each index supporting a table is assigned an index identifier and wherein said information specifying which index supports said foreign key comprises the index identifier assigned to the index.

11. The method of claims 1, wherein each index supporting a table is assigned an index identifier and wherein said information specifying which fields of said master table contribute to said unique key comprises the index identifier assigned to the index.

12. The method of claim 1, wherein said information specifying the master table includes a name for the master table.

13. The method of claim 1, wherein said first referential integrity descriptor further includes a modify qualifier specifying whether to restrict or cascade changes made to corresponding reference values in the master table.

14. The method of claim 1, wherein said information specifying which fields of the detail table contribute to said foreign key comprises a field number for each such field.

15. The method of claim 1, wherein said first referential integrity descriptor further stores a list identifying at least one field of the master table which contributes to the unique key of the master table.

16. In an information processing system, a method for maintaining referential integrity of data stored in database tables, the method comprising:
   (a) receiving from a user a request for a desired referential integrity constraint between at least one corresponding field of first and second database tables, said first table being a master table where its at least one corresponding field forms a unique key, and said second table being a detail table where its at least one corresponding field forms a foreign key matching said unique key;
   (b) storing with the detail table a first referential integrity descriptor sufficient to characterize said foreign key and said unique key, said information including information identifying said at least one field of the detail table forming said foreign key and identifying said at least one field of the master table forming said unique key, said first referential integrity descriptor being stored such that a transfer of said detail table to another location includes transfer of said first referential integrity descriptor;
   (c) storing with the master table a second referential integrity descriptor sufficient to characterize the detail table which the master table supports, said information including information identifying said at least one field of the detail table forming said foreign key and identifying said at least one field of the master table forming said unique key, said second referential integrity descriptor being stored such that a transfer of said master table to another location includes transfer of said second referential integrity descriptor; and
   (d) for each request received to modify or delete a record in the detail table, determining whether the request to modify would violate the requested referential integrity constraint, by examining said first and second referential integrity descriptors.

17. The method of claim 16, wherein said request received from the user in step (a) includes a constraint name comprising descriptive text, said constraint name being stored with said first referential integrity descriptor in step (b) and being stored with said second referential integrity descriptor in step (c).

18. The method of claim 16, wherein said first referential integrity descriptor is stored as a part of said detail table.

19. The method of claim 16, wherein said first referential integrity descriptor is stored on a storage device as an associated file stored together with said detail table.

20. The method of claim 16, wherein said second referential integrity descriptor is stored as a part of said master table.

21. The method of claim 16, wherein said second referential integrity descriptor is stored on a storage device as an associated file stored together with said master table.

22. The method of claim 16, wherein said first referential integrity descriptor further specifies a foreign key index file, said foreign key index file specifying an order of said detail table based on values stored in said at least one field of the detail table which forms said foreign key.

23. The method of claim 16, wherein said second referential integrity descriptor further specifies a unique key index file, said unique key index file specifying an order of said master table based on values stored in said at least one field of the master table which forms said unique key.

24. The method of claim 16, wherein said first table is a master table for a plurality of detail tables, and wherein a plurality of second referential integrity descriptors sufficient to characterize each detail table which the master table supports is stored with the master table, each second referential integrity descriptor sufficient to characterize a particular detail table which the master table supports.

25. The method of claim 16, wherein said request received from the user in step (a) includes information specifying whether modifications to values stored in said at least one corresponding field of the master table cascade to said at least one corresponding field of the detail table.

26. The method of claim 16, wherein said request received from the user in step (a) includes information specifying whether deletion of values stored in said at least one corresponding field of the master table are permitted if identical values are stored in said at least one corresponding field of the detail table.

27. A data processing system comprising:

means for storing a plurality of database tables, each table storing records comprising a plurality of fields;

means for requesting a referential integrity constraint between corresponding fields of first and second tables, said first table having at least one field whose values must match values stored in at least one corresponding field of said second table;

means for associating with said first table a first descriptor specifying said at least one field of the first table whose values must match values stored in at least one corresponding field of said second table and further specifying said at least one corresponding field of said second table, so that a transfer of said first table to another location includes transfer of said first descriptor;

means for associating with said second table a second descriptor specifying said at least one field of the first table whose values must match values stored in at least one corresponding field of said second table and further specifying said at least one corresponding field of said second table, so that a transfer of said second table to another location includes transfer of said second descriptor; and means, responsive to said first and second descriptors, for determining whether a database operation modifying either said first table or said second table may be performed without violating said referential integrity constraint.

28. The system of claim 27, wherein said first descriptor comprises a first referential integrity descriptor storing information sufficient to characterize one or more fields of said first table whose values must match values stored in at least one corresponding field of said second table.

29. The system of claim 27, wherein said second descriptor comprises a second referential integrity descriptor storing information sufficient to characterize one or more fields of said second table whose values must be matched by values stored in said at least one corresponding field of said first table.

30. The system of claim 27, wherein said one or more fields of said first table form a unique key for said first table, and wherein said at least one corresponding field of said second table forms a foreign key for linking said first table with said unique key of said second table.

31. The system of claim 30, wherein said unique key comprises a primary key for said first table.

* * * * *

UNITED STATES PATENT AND TRADEMARK OFFICE
CERTIFICATE OF CORRECTION

PATENT NO : 5,745,896
DATED : April 28, 1998
INVENTOR(S) : Narayanan Vijaykumar

It is certified that error appears in the above-identified patent and that said Letters Patent is hereby corrected as shown below:

On the title page, item [73]:

--Assignee: Borland International, Inc., Scotts Valley, Calif.--

Signed and Sealed this

Fourteenth Day of July, 1998

Attest:

BRUCE LEHMAN

Attesting Officer

Commissioner of Patents and Trademarks